US007867076B2

(12) United States Patent
Tulley et al.

(10) Patent No.: US 7,867,076 B2
(45) Date of Patent: *Jan. 11, 2011

(54) SYSTEMS AND METHODS FOR ALLOCATING AN OUTCOME AMOUNT AMONG A TOTAL NUMBER OF EVENTS

(75) Inventors: Stephen C. Tulley, Stamford, CT (US); James A. Jorasch, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 143 days.

This patent is subject to a terminal disclaimer.

(21) Appl. No.: 11/456,359

(22) Filed: Jul. 10, 2006

(65) Prior Publication Data

US 2006/0252491 A1 Nov. 9, 2006

Related U.S. Application Data

(63) Continuation of application No. 11/385,644, filed on Mar. 21, 2006, which is a continuation of application No. 09/606,745, filed on Jun. 29, 2000, now Pat. No. 7,179,168, and a continuation-in-part of application No. 09/063,590, filed on Apr. 21, 1998, now Pat. No. 6,402,614, which is a continuation of application No. 08/624,998, filed on Mar. 29, 1996, now Pat. No. 5,871,398, which is a continuation-in-part of application No. 08/497,080, filed on Jun. 30, 1995, now abandoned.

(60) Provisional application No. 60/193,093, filed on Mar. 30, 2000.

(51) Int. Cl.
*A63F 13/00* (2006.01)

(52) U.S. Cl. ............................ 463/17; 463/25; 463/42; 273/269

(58) Field of Classification Search ....................... None
See application file for complete search history.

(56) References Cited

U.S. PATENT DOCUMENTS 4,157,829 A 6/1979 Goldman et al.

(Continued)

FOREIGN PATENT DOCUMENTS

EP 0 032 410 A1 7/1981

(Continued)

OTHER PUBLICATIONS

Brochure: "Oasis Electronic Pull-Tab Network", Copyright 1993, Infinational Technologies, Inc.

(Continued)

*Primary Examiner*—M. Sager
(74) *Attorney, Agent, or Firm*—Fincham Downs LLC; Michael D. Downs

(57) ABSTRACT

Systems and methods are provided for operating a gaming system. In one embodiment, an outcome amount associated with a total number of events is determined. For example, a total payout amount associated with a number of instant lottery tickets may be determined. Based on a parameter associated with a player, the outcome amount is allocated among the total number of events. The outcome amount may be allocated, for example, based on a total number of events selected by the player.

10 Claims, 15 Drawing Sheets

U.S. PATENT DOCUMENTS

| | | | | |
|---|---|---|---|---|
| 4,317,957 | A | 3/1982 | Sendrow | |
| 4,398,708 | A | 8/1983 | Goldman et al. | |
| 4,494,197 | A | 1/1985 | Troy et al. | |
| 4,582,324 | A | 4/1986 | Koza et al. | |
| 4,652,998 | A | 3/1987 | Koza et al. | |
| 4,689,742 | A | 8/1987 | Troy et al. | |
| 4,760,527 | A | 7/1988 | Sidley | |
| 4,764,666 | A | 8/1988 | Bergeron | |
| 4,842,278 | A | 6/1989 | Markowicz | |
| 4,856,787 | A | 8/1989 | Itkis | |
| 4,982,337 | A | 1/1991 | Burr et al. | |
| 5,038,022 | A | 8/1991 | Lucero | |
| 5,042,809 | A | 8/1991 | Richardson | |
| 5,069,453 | A | 12/1991 | Koza et al. | |
| 5,083,271 | A | 1/1992 | Thacher et al. | |
| 5,085,436 | A | 2/1992 | Bennett | |
| 5,096,195 | A | 3/1992 | Gimmon | |
| 5,116,055 | A | 5/1992 | Tracy | |
| 5,119,295 | A | 6/1992 | Kapur | |
| 5,123,649 | A | 6/1992 | Tiberio | |
| 5,179,517 | A | 1/1993 | Sarbin et al. | |
| 5,223,698 | A | 6/1993 | Kapur | |
| 5,239,165 | A | 8/1993 | Novak | |
| 5,276,312 | A | 1/1994 | McCarthy | |
| 5,277,424 | A | 1/1994 | Wilms | |
| 5,283,734 | A | 2/1994 | Von Kohorn | |
| 5,297,205 | A | 3/1994 | Audebert et al. | |
| 5,317,135 | A | 5/1994 | Finocchio | |
| 5,324,035 | A | 6/1994 | Morris et al. | |
| 5,327,485 | A | 7/1994 | Leaden | |
| 5,330,185 | A | 7/1994 | Wells | |
| 5,351,970 | A | 10/1994 | Fioretti | |
| 5,380,007 | A | 1/1995 | Travis et al. | |
| 5,398,932 | A | 3/1995 | Eberhardt et al. | |
| 5,401,023 | A * | 3/1995 | Wood | 463/13 |
| 5,413,357 | A | 5/1995 | Schulze et al. | |
| 5,415,416 | A | 5/1995 | Scagnelli et al. | |
| 5,417,424 | A | 5/1995 | Snowden et al. | |
| 5,429,361 | A * | 7/1995 | Raven et al. | 463/25 |
| 5,436,967 | A | 7/1995 | Hanson | |
| 5,457,306 | A * | 10/1995 | Lucero | 235/380 |
| 5,499,816 | A | 3/1996 | Levy | |
| 5,511,781 | A * | 4/1996 | Wood et al. | 463/13 |
| 5,518,253 | A | 5/1996 | Pocock et al. | |
| 5,569,082 | A | 10/1996 | Kaye | |
| 5,709,603 | A | 1/1998 | Kaye | |
| 5,722,890 | A | 3/1998 | Libby et al. | |
| 5,768,382 | A | 6/1998 | Schneier et al. | |
| 5,779,549 | A | 7/1998 | Walker et al. | |
| 5,787,156 | A | 7/1998 | Katz | |
| 5,791,990 | A | 8/1998 | Schroeder et al. | |
| 5,871,398 | A | 2/1999 | Schneier et al. | |
| 5,885,158 | A | 3/1999 | Torango et al. | |
| 5,970,143 | A | 10/1999 | Schneier et al. | |
| 6,007,426 | A | 12/1999 | Kelly et al. | |
| 6,016,338 | A | 1/2000 | Bansal et al. | |
| 6,017,032 | A | 1/2000 | Grippo et al. | |
| 6,024,640 | A | 2/2000 | Walker et al. | |
| 6,033,306 | A | 3/2000 | De Souza | |
| 6,068,552 | A | 5/2000 | Walker et al. | |
| 6,077,163 | A | 6/2000 | Walker et al. | |
| 6,302,794 | B1 | 10/2001 | Ogawa | |
| 6,402,614 | B1 | 6/2002 | Schneier et al. | |
| 6,719,631 | B1 * | 4/2004 | Tulley et al. | 463/17 |
| 7,179,168 | B1 * | 2/2007 | Tulley et al. | 463/25 |
| 2002/0090986 | A1 | 7/2002 | Cote et al. | |
| 2004/0204234 | A1 * | 10/2004 | Walker et al. | 463/25 |
| 2006/0160599 | A1 * | 7/2006 | Tulley et al. | 463/16 |
| 2006/0252490 | A1 * | 11/2006 | Tulley et al. | 463/17 |

FOREIGN PATENT DOCUMENTS

| | | | |
|---|---|---|---|
| EP | 0 106 187 | B1 | 11/1985 |
| EP | 0 307 925 | A2 | 3/1989 |
| EP | 0 405 776 | A2 | 1/1991 |
| EP | 0 478 412 | A1 | 4/1992 |
| EP | 0 487 446 | A2 | 5/1992 |
| EP | 0 907 136 | A1 | 4/1999 |
| FR | 2 697 653 | A1 | 5/1994 |
| GB | 2 121 569 | A | 12/1983 |
| GB | 2 148 135 | A | 5/1985 |
| JP | 01258178 | A | 10/1989 |
| JP | 01269158 | A | 10/1989 |
| JP | 01269164 | A | 10/1989 |
| JP | 01316869 | | 12/1989 |
| JP | 02110660 | A | 4/1990 |
| JP | 03269763 | | 12/1991 |
| JP | 06-35944 | | 2/1994 |
| WO | WO 86/02752 | | 5/1986 |
| WO | WO 92/16914 | | 10/1992 |
| WO | WO 93/19428 | | 9/1993 |
| WO | WO 94/19906 | | 9/1994 |
| WO | WO 95/05876 | | 3/1995 |
| WO | WO 98/26361 | | 6/1998 |
| WO | WO 98/36809 | | 8/1998 |
| WO | WO 98/55191 | | 12/1998 |
| WO | WO 99/26204 | | 5/1999 |

OTHER PUBLICATIONS

"Interactive Network (IN) announced Tues . . . ", Communications Daily, Nov. 30, 1994, vol. 14, No. 230, ISSN: 0277-0679.
"Interactive Network Sets Up Gaming Subsidiary", Interactive Facts, Dec. 1994, vol. 1, No. 25.
"Interactive Network Launches Wagering Unit", Multimedia Business Report, Dec. 2, 1994, ISSN: 1065-8300.
"Interactive Network Forms Real-Time Gambling Subsidiary", Newsbyte News Network, Dec. 7, 1994.
Dvorak, John C., "Gambling on a PC near you.", PC Magazine, May 16, 1995, vol. 14, No. 9, p. 89, ISSN: 0888-8507.
PCT International Search Report for Application No. PCT/US01/10133, dated Oct. 19, 2001.
"Harrah's Reno Uses Hybrid ISDN to Attract Customers", Viewtext, Mar. 1989, Vo. 10, No. 3, ISSN: 0275-0686.
"Agent Speaks Directly to the Customer on the Screen", ISND News, Mar. 1, 1989, vol. 2, No. 4, ISSN: 0899-9554.
Conniff, Michael, "Don't Bet Against Harrah's When it Comes to ISDN", Electronic Service Update, May 1, 1989, vol. 2, No. 5.
"President Riverboat Casino First to Boast Over $1 Million' Hand Pay to Slot Jackpot Winners" Jun. 6, 19991; Lifestyle; PR Newswire.
"Scientific Games Announces New Board Member" Dec. 5, 1994; Business Editors; Business Wire.
Peterson, Ivars. "Computer Triumphs Over Human Champion; IBM Chess Computer Big Blue Defeats Garry Kasparov; Brief Article" May 17, 1997; No. 20, vol. 151; p. 300; ISSN: 0036-8423; Science News.
Sokolic, William H. "Gaming and Entertainment Atlantic City" Jun. 18, 1998; Entertainment; p. 061; The New York Post.
"Silicon Gaming Release Sriddle of the Sphinx™; New Slot Game Offers Players Dual Win Opportunities" Jul. 29, 1998; Financial News, PR Newswire.
Montgomery, Christine. "Casinos Bet You'll Gamble with Your Health" Feb. 22, 1999; Accent, p. ID, The Palm Beach Post.
Rosenberg, Amy S. "Elvis is in the Building, and Ready to Take Your Money New slot Machines Give Players More than a Chance to Win" Mar. 21, 1999; p. P13A; The Sunday Gazette Mail, 3 pp.
"Riddle of the Sphinx" download date Feb. 23, 2000; www.silicongaming.com.
"Moneytime, The New Multi-Sensory Bonus Slot Extravaganza from Mikohn, is Setting Records in Increased Slot Play" download date Mar. 24, www.Mikohn.com/monrytime.htrr.

"Lottery.com wins the Jackpot with Oraclemobile.com; Two Leaders Team Up for the Wireless Market" Feb. 23, 2000; Business editors, Business Wire.
U.S. Appl. No. 08/497,080 entitled, "Off-Line Remote Lottery System," filed Jun. 30, 1995.
U.S. Appl. No. 09/063,590 entitled, "Off-Line Remote Systems for Lotteries and Games of Skill," filed Apr. 21, 1998.
U.S. Appl. No. 09/526,834 entitled, "systems and methods for Determining a Gaming System Event Based on a Player-Established Event Parameter," filed Mar. 16,2000, 85 pp.
Office Action for U.S. Appl. No. 08/497,080, mailed Jan. 17, 1997, 1 pg.
Notice of Allowability for U.S. Appl. No. 08/624,988, mailed May 20, 1998, 1 pg.
Office Action for U.S. Appl. No. 09/063,590 mailed Jun. 7, 2001, 7 pp.
Notice of Allowability for U.S. Appl. No. 09/063,590 mailed Jan. 7, 2002, 1 pg.
Notice of Allowability for U.S. Appl. No. 10/145,964 mailed Mar. 19, 2003, 2 pp.
Office Action for U.S. Appl. No. 10/145,964 mailed Nov. 6, 2002, 2001, 5 pp.
Notice of Allowance for U.S. Appl. No. 10/620,260 mailed Sep. 28, 2004, 4 pp.
Office Action for U.S. Appl. No. 10/620,260 mailed Jun. 17, 2004, 4 pp.
Notice of Allowance for U.S. Appl. No. 11/304,103 mailed Aug. 21, 2007, 6 pp.
Notice of Allowance for U.S. Appl. No. 11/426,959 mailed Oct. 1, 2007, 6 pp.
Office Action for U.S. Appl. No. 11/426,997 mailed Jan. 8, 2009, 7 pp.
Notice of Acceptance for Australian Application No. 52850/98 mailed Aug. 18, 2000, 2 pp.
Office Action for Australian Application No. 52850/98 mailed Dec. 13, 1999, 2 pp.
Office Action for Australian Application No. 52850/98 mailed Feb. 2, 1999, 2 pp.
Notice of Acceptance for Australian Application No. 7706/98 mailed Jan. 13, 2004, 1 pg.
Office Action for Australian Application No. 7706/98 mailed Jan. 13, 2003, 1 pg.
Office Action for Australian Application No. 7706/98 mailed Apr. 29, 2002, 2 pp.
European Search Report for European Application No. 96 92 3577 mailed May 4, 2000, 3 pp.
Office Action for European Application No. 96 92 3577 mailed May 26, 2003, 4 pp.
Decision to Grant European Application No. 96 92 3577 mailed Apr. 26, 2007, 1 pp.
Office Action for Japanese Application No. 9-519950 mailed Feb. 8, 2005, 3 pp.
International Search Report for PCT Application No. PCT/US96/11656 mailed Oct. 31, 1996, 3 pp.
Office Action for U.S. Appl. No. 11/426,963 mailed May 27, 2010, 11 pp.
Office Action for U.S. Appl. No. 11/426,963 mailed Dec. 3, 2009, 11 pp.
Notice of Allowance for U.S. Appl. No. 11/426,963 mailed Aug. 21, 2009, 5 pp.
Office Action for U.S. Appl. No. 11/426,963 mailed Dec. 24, 2008, 12 pp.
Office Action for U.S. Appl. No. 11/426,963 mailed Jun. 13, 2008, 9 pp.
Office Action for U.S. Appl. No. 11/426,963 mailed Sep. 28, 2007, 7 pp.
Notice of Allowance for U.S. Appl. No. 09/606,745 mailed Nov. 2, 2005, 5 pp.
Office Action for U.S. Appl. No. 09/606,745 mailed May 16, 2005, 4 pp.
Notice of Allowance for U.S. Appl. No. 09/606,745 mailed Sep. 28, 2004, 5 pp.
Office Action for U.S. Appl. No. 09/606,745 mailed Feb. 10, 2004, 9 pp.
Office Action for U.S. Appl. No. 09/606,745 mailed Aug. 4, 2003, 11 pp.
Office Action for U.S. Appl. No. 09/606,745 mailed Apr. 10, 2002, 11 pp.
Office Action for U.S. Appl. No. 11/385,644 mailed Jul. 31, 2009, 12 pp.
Office Action for U.S. Appl. No. 11/385,644 mailed Nov. 17, 2008, 11 pp.
Office Action for U.S. Appl. No. 11/385,644 mailed Jul. 25, 2008, 4 pp.
Office Action for U.S. Appl. No. 11/385,644 mailed Oct. 16, 2007, 6 pp.
Office Action for U.S. Appl. No. 11/456,353 mailed 08/04/19, 9 pp.
Office Action for U.S. Appl. No. 11/456,353 mailed Nov. 17, 2008, 8 pp.
Office Action for U.S. Appl. No. 11/456,353 mailed Jul. 28, 2008, 7 pp.
Notice of Allowance for U.S. Appl. No. 11/385,644 mailed Sep. 2, 2010, 11 pp.
Notice of Allowance for U.S. Appl. No. 11/456,353 mailed Sep. 7, 2010, 11 pp.

* cited by examiner

500

| GAME IDENTIFIER 502 | EVENT FORMAT NAME 504 | EVENT FORMAT DESCRIPTION 506 | EVENT DURATION TYPE 508 | AVERAGE TIME PER EVENT 510 | PAYOUT PERCENTAGE 512 | TOTAL NUMBER OF EVENTS 514 | NUMBER OF REMAINING EVENTS 516 |
|---|---|---|---|---|---|---|---|
| G 01 | TWENTY-ONE | REVEAL THE "DEALER'S CARDS" AND COMPARE... | VARIABLE | 1 / 10 SEC. | 55% | 90 | 90 |
| G 02 | AUTO RACING | REVEAL YOUR STARTING AND FINISHING POSITION... | VARIABLE | 1 / 30 SEC. | 48% | 50 | 0 |
| G 03 | SCRATCH-N-WIN | REVEAL THE ENTIRE PLAY AREA, MATCH 3 LIKE SYM... | VARIABLE | 1 / 5.5 SEC. | 52% | 400 | 218 |
| G 04 | SLOT MACHINE | PULL THE HANDLE TO SPIN THE REELS, MATCH YOUR... | FIXED | 1 / 8 SEC. | 90% | 0 | 0 |

FIG. 5

600

| PLAYER TERMINAL IDENTIFIER: PT 089 | | | | | | | | |
|---|---|---|---|---|---|---|---|---|
| GAME SESSION IDENTIFIER 602 | GAME IDENTIFIER 604 | TOTAL TIME PERIOD 606 | AVERAGE TIME PER EVENT 608 | TIME REMAINING 610 | TOTAL WAGER AMOUNT 612 | WAGER BALANCE AMOUNT 614 | CUMULATIVE PAYOUT AMOUNT 616 | SESSION STATUS 618 |
| GS 0001 | G 01 | 00:15:00 | 1 / 11.5 SEC | 00:05:00 | $15.00 | $12.84 | $6.82 | OUTSTANDING |

FIG. 6

700

| PLAYER IDENTIFIER 702 | NAME 704 | ADDRESS 706 | TERMINAL IDENTIFIER 708 | TERMINAL ADDRESS 710 | PAYMENT INFORMATION 712 | DISTRIBUTION PREFERENCE 714 |
|---|---|---|---|---|---|---|
| P001 | BOB WHITE | 10 MAIN STREET CENTERVILLE, NY 10001 | PT101 | 1234.5678.9012.3456 | 1111-2222-3333-4444 | LARGER PRIZES |
| P002 | MARY RED | 203-555-1234 | PT102 | MRED@EROLS.COM | 2222-1111-3333-4444 | FREQUENT PRIZES |
| P005 | SAM GREENE | SGREEENE@ADDRESS.COM | PT105 | 203-555-0123 | CASH AT RETAILER | LATER PRIZES |

FIG. 7

800

| GAME SESSION IDENTIFIER: GS 001 802 | |
|---|---|
| EVENT IDENTIFIER 804 | EVENT RESULT 806 |
| E-0001 | 0 |
| E-0002 | 0 |
| E-0003 | +5 |
| E-0004 | 0 |
| E-0005 | +1 |
| E-0006 | 0 |

FIG. 8A

810

| GAME SESSION IDENTIFIER: GS 001 802 | |
|---|---|
| EVENT IDENTIFIER 804 | EVENT RESULT 806 |
| E-0001 | 0 |
| E-0002 | +1 |
| E-0003 | 0 |
| E-0004 | +1 |
| E-0005 | +1 |
| E-0006 | 0 |
| E-0007 | +2 |
| E-0008 | 0 |
| E-0009 | +1 |

FIG. 8B

820

| GAME SESSION IDENTIFIER: GS 001 802 | |
|---|---|
| EVENT IDENTIFIER 804 | EVENT RESULT 806 |
| E-0001 | +3 |
| E-0002 | 0 |
| E-0003 | +3 |

FIG. 8C

SYSTEMS AND METHODS FOR ALLOCATING AN OUTCOME AMOUNT AMONG A TOTAL NUMBER OF EVENTS

CROSS REFERENCE TO RELATED APPLICATIONS

The present application is a continuation of U.S. patent application Ser. No. 11/385,644, entitled "Systems and Methods for Allocating an Outcome Amount Among a Total Number of Events", filed Mar. 21, 2006;

which is a continuation application of U.S. patent application Ser. No. 09/606,745 entitled "Systems and Methods for Allocating an Outcome Amount Among a Total Number of Events", filed Jun. 29, 2000 and issued as U.S. Pat. No. 7,179,168 on Feb. 20, 2007;

which is a continuation-in-part of U.S. patent application Ser. No. 09/063,590, filed Apr. 21, 1998 and which issued on Jun. 11, 2002 as U.S. Pat. No. 6,402,614 B1;

which is a continuation of U.S. patent application Ser. No. 08/624,998, filed Mar. 29, 1996 and which issued on Feb. 16, 1999 as U.S. Pat. No. 5,871,398;

which is a continuation-in-part of U.S. patent application Ser. No. 08/497,080, filed Jun. 30, 1995, now abandoned;

and which also claims the benefit of U.S. Provisional Patent Application No. 60/193,093 entitled "Systems and Methods foe Distributing Instant Lottery Game Outcomes" filed Mar. 30, 2000.

Each of the above-referenced applications is incorporated by reference herein in its entirety.

This application is also related to U.S. patent application Ser. No. 11/456,353 filed Jul. 10, 2006.

FIELD

The present invention relates to gaming systems. In particular, the present invention relates to systems and methods for allocating an outcome amount among a total number of events.

BACKGROUND

Many people enjoy the entertainment provided by various types of gaming systems. For example, many people enjoy playing "scratch-off" style instant lottery games. In this type of game, a player purchases a paper game ticket for a fixed price (e.g., each game ticket may represent a one dollar wager). The player uncovers a portion of the game ticket, such as by scratching off a coating of latex, to reveal one or more symbols (e.g., revealing three symbols each representing a potential payout amount). Based on the revealed symbols, the player is able to determine a payout amount, if any, associated with the game ticket. One reason players enjoy this type of game is the participation the game provides, such as the participation provided by uncovering portions of the game ticket. Players also enjoy the instant gratification provided by such games. That is, players do not need to wait for a periodic lottery drawing, such as a selection of winning lottery numbers, to determine if they have won. Another reason players enjoy these types of games is that players can purchase a number of game tickets and play the game at their convenience.

Conventional instant lottery games, however, have a number of disadvantages. For example, it is expensive to produce and distribute the paper game tickets with appropriate symbols and latex coatings. Although different game formats may be made available to players (e.g., "win ten thousand dollars if a 'yes' is revealed when you scratch off this area" or "match three numbers on this game ticket to win that dollar amount"), only a limited number of game formats can be printed and distributed to merchants because of the cost and physical limitations associated with producing and distributing game tickets.

Another disadvantage associated with conventional instant lottery systems is that the level of participation provided to a player is limited. For example, a player's participation may be limited to scratching off certain areas on a game ticket. In addition, the gratification that can be provided to a player is limited. For example, a player with five dollars may only be able to purchase and play five game tickets.

These limitations may reduce a potential player's interest in the game, resulting in fewer game tickets being sold.

To overcome some of these disadvantages, U.S. Pat. No. 5,871,398 discloses an off-line remote lottery system which enables a player to purchase instant-type lottery game outcomes from a central computer. The player views the outcomes on a remotely located gaming computer, such as a Personal Digital Assistant (PDA).

These lottery systems would be further enhanced by an improved gaming system as described herein.

SUMMARY OF THE INVENTION

To alleviate problems inherent in the prior art, the present invention introduces systems and methods for allocating an outcome amount among a total number of events.

In one embodiment of the present invention, an outcome amount associated with a total number of events is determined. The outcome amount is allocated among the total number of events based on a parameter associated with a player. The total number of events may be, for example, greater than one.

In another embodiment, it is arranged for a player to provide payment of an amount based on a total wager amount. An outcome amount is determined in response to the player providing the total wager amount. Based on a parameter associated with the player, the outcome amount is distributed among a plurality of scratch-off type instant game tickets. A result associated with at least one of the scratch-off type instant game tickets is revealed to the player, and it is arranged for the player to receive payment of an amount associated with the result.

In still another embodiment, it is arranged for a player to provide payment of an amount based on a total wager amount. An indication of an outcome amount associated with an original number of lottery tickets is received via a communication network, and the outcome amount is allocated among the original number of lottery tickets. A modified number of lottery tickets is then determined, and the outcome amount, or a portion of the outcome amount, is re-allocated among the modified number of lottery tickets according to at least one of: (i) a predetermined rule, (ii) a predetermined formula, (iii) a stored outcome table, and (iv) a random process. The re-allocating comprises associating at least a portion of a lottery ticket payout amount with at least one of the modified number of lottery tickets. The lottery ticket payout amount is revealed to the player, and it is arranged for the player to receive payment of an amount associated with the lottery ticket payout amount.

In still another embodiment, an expected value associated with a player is determined. Based on a parameter associated with the player, the expected value is allocated among a total number of events.

In still another embodiment, an outcome amount associated with a player is determined. Based on a parameter associated with a player, the outcome amount is allocated over at least one of: (i) time, and (ii) a representation of space.

In still another embodiment, it is arranged for a player to provide, via a payment identifier, payment of a total wager amount. An indication associated with the total wager amount is transmitted to a controller, and an indication associated with a total payout amount is received from the controller. An indication associated with a total number of lottery events is received from a player. Based on a parameter associated with the player, the total payout amount is allocated among the total number of lottery events. At least a portion of the total payout amount is revealed to the player, and it is arranged for the player to receive, via the payment identifier, payment of the total payout amount.

In still another embodiment, an outcome amount associated with a player is determined. This outcome amount is allocated among a total number of events.

In still another embodiment, an outcome amount is determined, and, based on a parameter associated with a player, the outcome amount is allocated among a total number of events.

In still another embodiment, a plurality of outcome amounts associated with a prior total number of events are determined, the prior total number of events being more than a modified number of events. The outcomes amounts are then allocated among the modified number of events.

In still another embodiment, a series of event results is determined for an original number of events. The series of event results is then allocated among a modified number of events, both the original number of events and the modified number of events being greater than one.

In still another embodiment, a series of event results is determined for an original number of events, each of the series of event results being associated with a value within a predetermined range. The series of event results is then allocated among a modified number of events using at least one value outside of the predetermined range.

In still another embodiment, a series of event results is determined for an original number of events, none of the series of event results being associated with a negative value. The series of event results is then allocated among a modified number of events using at least one negative value.

Another embodiment of the present invention comprises: means for determining an outcome amount associated with a total number of events; and means for allocating, based on a parameter associated with a player, the outcome amount among the total number of events.

Another embodiment comprises: means for arranging for a player to provide payment of an amount based on a total wager amount; means for determining an outcome amount in response to the player providing the total wager amount; means for distributing, based on a parameter associated with a player, the outcome amount among a plurality of scratch-off type instant game tickets; means for revealing to the player a result associated with at least one of the scratch-off type instant game tickets; and means for arranging for the player to receive payment of an amount associated with the result.

Still another embodiment comprises: means for arranging for a player to provide payment of an amount based on a total wager amount; means for receiving, via a communication network, an indication of an outcome amount associated with an original number of lottery tickets; means for allocating the outcome amount among the original number of lottery tickets; means for determining a modified number of lottery tickets; means for re-allocating the outcome amount among the modified number of lottery tickets according to at least one of; (i) a predetermined rule, (ii) a predetermined formula, (iii) a stored outcome table, and (iv) a random process, wherein said re-allocating comprises associating a lottery ticket payout amount with at least one of the modified number of lottery tickets; means for revealing the lottery ticket payout amount to the player; and means for arranging for the player to receive payment of an amount associated with the lottery ticket payout amount.

Still another embodiment comprises: means for determining an expected value associated with a player; and means for allocating, based on a parameter associated with the player, the expected value among a total number of events.

Still another embodiment comprises: means for determining an outcome amount associated with a player; and means for allocating, based on a parameter associated with a player, the outcome amount over at least one of (i) time, and (ii) a representation of space.

Still another embodiment comprises; means for arranging for a player to provide, via a payment identifier, payment of a total wager amount; means for transmitting an indication associated with the total wager amount to a controller; means for receiving an indication associated with a total payout amount from the controller; means for receiving from the player an indication associated with a total number of lottery events; means for allocating, based on a parameter associated with the player, the total payout amount among the total number of lottery events; means for revealing at least a portion of the total payout amount; and means for arranging for the player to receive, via the payment identifier, payment of the total payout amount.

Still another embodiment comprises: means for determining an outcome amount associated with a player; and means for allocating the outcome amount among a total number of events.

Still another embodiment comprises: means for determining an outcome amount; and means for allocating, based on a parameter associated with a player, the outcome amount among a total number of events.

Still another embodiment comprises: means for determining a plurality of outcome amounts associated with a prior total number of events, the prior total number of events being more than a modified number of events; and means for allocating the outcome amounts among the modified number of events.

Still another embodiment comprises: means for determining a series of event results for an original number of events; and means for allocating the series of event results among a modified number of events, both the original number of events and the modified number of events being greater than one.

Still another embodiment comprises: means for determining a series of event results for an original number of events, each of the series of event results being associated with a value within a predetermined range; and means for allocating the series of event results among a modified number of events using at least one value outside of the predetermined range.

Still another embodiment comprises: means for determining a series of event results for an original number of events, none of the series of event results being associated with a negative value; and means for allocating the series of event results among a modified number of events using at least one negative value.

With these and other advantages and features of the invention that will become hereinafter apparent, the nature of the invention may be more clearly understood by reference to the following detailed description of the invention, the appended claims, and the several drawings attached herein.

BRIEF DESCRIPTION OF THE DRAWINGS

FIG. 5 is a tabular representation of a portion of a game database according to an embodiment of the present invention.

FIG. 6 is a tabular representation of a portion of a game session database according to an embodiment of the present invention.

FIG. 7 is a tabular representation of a portion of a player database according to an embodiment of the present invention.

FIGS. 8A through 8C are tabular representation of portions of an event database according to an embodiment of the present invention.

DETAILED DESCRIPTION

Figure 1:
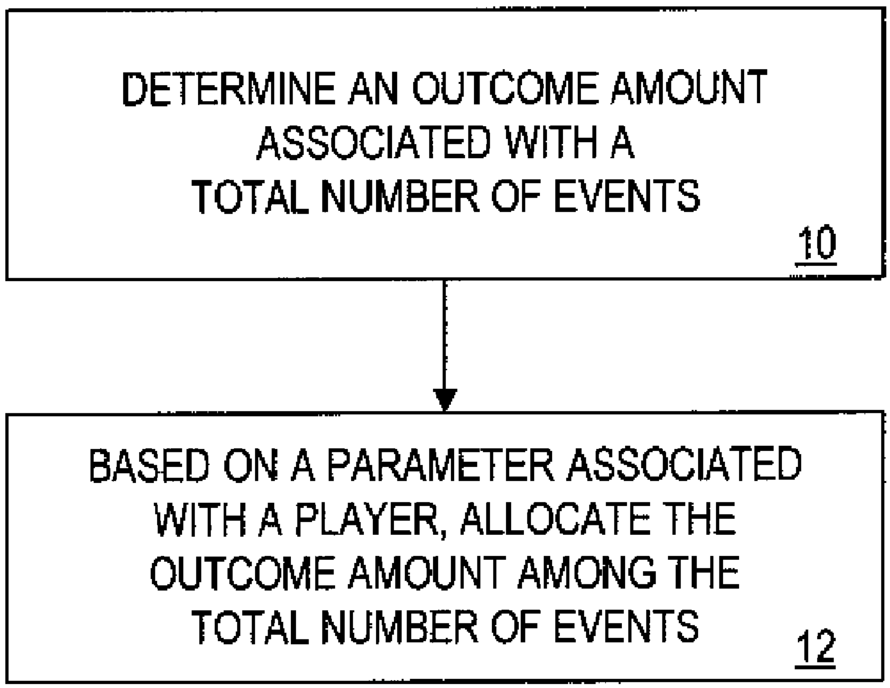
FIG. 1 is a flow chart of a method that may be performed according to an embodiment of the present invention.

The present invention is directed to systems and methods for allocating an outcome amount among a total number of "events" (e.g., by distributing the outcome amount among the total number of events based on a player-established event parameter). As used herein, an event may be any representation that is directly or indirectly indicated to a player. For example, an event may comprise an event result (e.g., "win" or "lose") that is displayed to a player. An event result may also comprise an event payout amount (e.g., "win one dollar" or "win five dollars") that is won by a player. Note that an event result may also comprise a negative amount ("lose one dollar").

An event "parameter" is any variable associated with the play of the gaming system. For example, one event parameter is a "total number of events." That is, a player may purchase and receive a total number of events, each event being associated with an event result. Each of the event results would then be indicated to the player as he or she played the game. As one example, a game may simply comprise flipping a coin one time (e.g., a "heads" indicates that the player has won, and a "tails" indicates that the player has not won). In this case, the number of times the coin is flipped may represent the total number of events. Note, however, that each event may comprise a number of separate indications to a player. For example, a game may comprise flipping a coin three times (e.g., three "heads" indicates that the player has won, but at least one "tails" indicates that the player has not won). In this case, each set of three coin flips may represent a single event. Thus, in the case of a lottery game ticket, a single game ticket may be associated with a single event, a single game ticket may be associated with more than one event (e.g., more than one chance to win is provided with each game ticket), or a number of game tickets may be associated with a single event (e.g., the player must collect a number of game tickets to spell "W-I-N").

Another event parameter is a "total wager amount." The total wager amount may represent an amount of money that a player wagers with respect to a total number of events. For example, a player may provide a payment of twenty dollars and receive twenty lottery game tickets (e.g., associated with twenty events). An "event wager amount," representing an amount of money that a player wagers with respect to a single event, is another example of an event parameter.

Another event parameter is a "total payout amount." The total payout amount may represent an amount of money that a player wins with respect to a total number of events. For example, a player may play three slot-machine type games (i.e., associated with three events) and win a total of ten dollars. An "event payout amount," representing an amount of money a player wins with respect to a single event, is another example of an event parameter. As used herein, an "outcome amount" may be, for example, a total payout amount or an event payout amount.

Another event parameter is a "payout percentage." The payout percentage may represent the average event payout amount per event wager amount. For example, if a ten dollar event wager amount will, on average, result in a five dollar event payout amount, the payout percentage would be fifty percent. Another event parameter is an "expected value" associated with an event. The expected value may be computed, for example, by multiplying a potential event payout amount by a probability of winning. For example, if an event has a thirty percent chance of winning two dollars and a seventy percent chance of winning nothing, the expected value would be $0.60 (i.e., 0.30*$2.00).

Another event parameter is a "total time period." The total time period may represent an amount of time it takes to play a game associated with a total number of events. For example, if a player plays a racing game during which an event result is displayed to the player every twenty seconds, a game session associated with six events will have a total time period of two minutes.

Another event parameter is an "event format." The event format may represent the type of game to be played by a player. For example a first event format may represent a golf game (e.g., a video game in which a player wins a prize if he or she can putt a golf ball into a hole) while a second event format may represent a card game (e.g., a video game in which a player wins a prize if he or she wins a game of blackjack).

For example, a player may use his or her Personal Computer (PC) to register with a remote Web-based game system. The player provides payment of five dollars (the total wager amount) and indicates that he or she will play a slot-machine type game (the event format) for ten minutes (the total playing time). Because each slot-machine type game takes thirty seconds to display a winning amount (the event payout amount) via an electronic slot machine (e g., having a video representation of spinning reels), the game system determines that the player will receive twenty games (the total number of events) and each game will be associated with a bet of $0.25 (the event wager amount).

They player then uses his or her Personal Computer (PC) to play the slot-machine type game for ten minutes. Each of the twenty event results revealed to the player during that time may be associated with a winning amount (the event payout amount). For example, the player may be told that he or she has won fifty cents when three cherries are displayed on the electronic slot machine. After the player has played the electronic slot machine twenty times, he or she may have won a total of four dollars (the total payout amount).

FIG. 1 is a flow chart of a method that may be performed according to an embodiment of the present invention.

At 10, an outcome amount associated with a total number of events is determined. For example, a total event payout may be determined in response to a player's purchase of a number of instant lottery tickets. According to one embodiment, an indication of the player's request is transmitted from a player device (e.g., the player's PC) to a controller. The controller may then transmit an indication of the total event payout amount to the player device. For example, a player may use his or her PDA to purchase five lottery tickets (e.g., by providing a payment of five dollars via his or her credit card account). In this case, the controller may transmit to the PDA an indication that the player's five lottery tickets are associated with a total payout amount of four dollars. Note that, according to one embodiment, the controller does not allocate the four dollars among the player's five lottery tickets.

The determination of the outcome amount may comprise receiving an indication of the outcome amount from, for example, a player device (including a device accessed by the player at a local retail store), a controller, and/or an event result server (e.g. a server associated with a lottery authority). The outcome amount may be received via a communication network, such as the Internet, and or a wired or wireless telephone network.

The determination of the outcome amount may instead comprise retrieving a stored indication of the outcome amount. The indication of the outcome amount may be retrieved from, for example, a database stored at a player device, a controller, or an event result server.

According to another embodiment, the determination of the outcome amount is performed by randomly generating the outcome amount. For example, a controller may randomly generate the outcome amount using any random or pseudo-random process.

Referring again to FIG. 1, at 12 the determined outcome amount is allocated among the total number of events based on a parameter associated with a player. The parameter associated with the player may be, for example, retrieved from one or more databases. The parameter associated with the player may instead be received from, for example, the player, a player device, a controller, and/or an event result server. According to one embodiment, the parameter associated with the player is received via a communication network, such as the Internet or a telephone network.

According to one embodiment, the outcome amount is allocated based on the outcome amount associated with the player. The outcome amount may also allocated based on the total number of events associated with the player. By way of example, a player device may receive an indication that a player who purchased ten lottery tickets is to receive a total payout amount of $8.00. The player device then allocates the $8.00 among the ten lottery tickets. For example, the player device may simply select one of the ten lottery tickets and allocate the entire $8.00 to that ticket. The player device may instead, for example, select four of the ten lottery tickets and allocate $2.00 to each of those tickets.

According to other embodiments, the outcome amount may be allocated based on, for example, a player's payout distribution preference. Consider the allocation of an $8.00 outcome amount among ten events. A player may indicate his or her payout frequency preference and/or payout magnitude preference, such as by selecting one of "less frequent but larger prizes" or "more frequent but smaller prizes." A player device may then, for example, allocate the $8.00 to two events (e.g., by allocating $4.00 to each of the two events) or six events (e.g., by allocating $1.00 to four events and $2.00 to two events) as appropriate. Similarly, a player may indicate a preferred standard deviation associated with the allocation of the outcome amount.

A player may also indicate his or her payout location preference. For example, a player may indicate that he or she prefers to receive more prizes towards then end of a series of tickets. Similarly, a player may indicate his or her payout order preference (e.g., by indicating that small prizes should always by revealed before large prizes).

Other factors that may be used to allocate the outcome amount include, for example, a total wager amount, an event wager amount, a total time period, and a game format. According to one embodiment, the outcome amount is allocated based on a payout currency preference. For example, a player may indicate that he or she agrees to receive half of the outcome amount in the form of a gift certificate to a particular merchant. Similarly, an outcome amount may be converted to frequent flyer miles, casino points, or WEBHOUSE® tokens.

According to still other embodiments, the outcome amount may be allocated based on, for example, demographic information, psychographic information (e.g., reflecting the player's opinions and values), and and/or player history information. For example, a controller may determine that older players prefer to have an outcome amount allocated in a particular way.

The allocation of the outcome amount may be performed, for example, by a controller and/or an event result server (e.g., a server associated with a lottery authority). The outcome amount may also be allocated by a player device, such as a PC, a portable computing device such as PDA, a game machine (e.g., a slot machine or a video poker machine), a wired or wireless telephone, a one-way or two-way pager, a kiosk, a Point of Sale (POS) terminal, and an Automated Teller Machine (ATM) device.

The allocation of the outcome amount may be performed in any number of ways. For example, a controller may select a subset of the total number of events and allocate the outcome amount among that subset. Consider the allocation of $5.00 among four events. The controller may first select the second and fourth events, and then allocate the $5.00 among those two events (e.g., $4.00 to the second event and $1.00 to the fourth event).

The outcome amount may also be allocated by determining a number of event outcomes based on the outcome amount. Each of the event outcomes may then be associated with one of the total number of events. For example, an outcome amount of $30.00 may initially be divided into event outcomes of $5.00, $15.00, and $10.00. These three event outcomes may then be allocated to three events (e.g., three particular events randomly selected from a total of ten events), The allocation of the outcome amount may be based on, for example, a predetermined formula, a stored outcome allocation table, and/or a random process. For example, a controller may use a random process and an allocation formula to divide an outcome amount into event outcomes and/or to select events.

In some cases, a total outcome amount may be initially received (e.g. a controller may transmit information to a player device indicating that the player will win a total of $2.50). According to other embodiments, a number of outcome amounts may be initially received. Consider a player who purchases six lottery tickets via his or her PDA. In this case, a controller may transmit information to the PDA indicating the following six lottery ticket outcome amounts; $0.50, $0.00, $0.75, $0.00, $0.00, and $0.50. The player may then indicate that he or she would like to have these outcome amounts revealed in only two events. The PDA may then, according to one embodiment, consolidate the first three lottery ticket outcome amounts into one outcome amount (e.g., $0.50+$0.00+$0.75=$1.25) and the last three lottery ticket outcome amounts into another outcome amount (e.g., $0.00+$0.00+$0.50=$0.50). The PDA may instead consolidate all six of the outcome amounts into a single outcome amount (e.g., $0.50+$0.00+$0.75+$0.00+$0.00+$0.50=$1.75), and then allocate that single outcome amount among the two events. Note that the player may ask to have an initial outcome amount (or number of outcome amounts) be re-allocated among a greater or lesser number of events. A player may also ask, for example, to have an initial number of outcome amounts be re-allocated among the same number of events (e.g., by indicating a modified payout distribution preference).

According to another embodiment, a payout percentage (instead of a monetary amount) is allocated among a total number of events. For example, a player may purchase four events, each event being associated with a payout percentage of sixty percent. The payout percentages may be re-allocated, for example, as follows: twenty percent, eighty percent, and eighty percent.

According to another embodiment, an expected value is allocated among a total number of events. For example, a player may purchase three events, each event being associated with a $2.00 wager amount and having fifty percent probability of winning. Each event, therefore, is associated with an expected value of $1.00. In this case, a player device may allocate the expected value among the events as follows: $0.50, $0.75, $1.75. This may be done, for example, by keeping each event associated with the $2.00 wager amount and adjust the probability of winning each event to: 0.25, 0.375, and 0.875. Another approach would be to adjust each event wager amount instead of, or along with, the probability of winning. These expected values may also be re-allocated, for example, when the total number of events is modified (e.g., the player asks that the three events be consolidated into two events).

In addition to allocating an outcome amount among events, an outcome amount may be allocated among time and/or a representation of space. For example, the outcome amount may be allocated over time (e.g., such that the player automatically receives a portion of the outcome amount every hour, or receives portions of the outcome amount according to a random, non-periodic scheduler. The outcome amount may also be allocated over a representation of space (e.g., over actual space or a representation of a virtual space). For example, portions of the outcome amount may be scattered over a geographic region (e.g., along a highway route, within a vacation resort, or at certain stores within a shopping mall). In this case, a player device may use, for example, a Global Positioning System (GPS) device or a transmitter/receiver device to determine the player's actual location. The outcome amount may instead be allocated, for example, along a virtual or electronically-represented race-track for the player to discover as he or she negotiates a race car simulation via a player device.

EXAMPLES

A player named Alice accesses a Web site associated with a lottery service using her home PC. Alice supplies her credit card number to the lottery service during a registration process and indicates that she prefers to win a smaller number of larger prizes. After registering, Alice indicates that she would like to receive $5.00 worth of events. The lottery service charges $5.00 using her credit card number and retrieves the results of five instant lottery tickets (costing one dollar each) previously purchased by the lottery service from a lottery authority. Those five results were: $0.00, $2.00, $6.00, $0.00, and $0.00 respectively. The lottery service transmits information to Alice's PC indicating that the purchased events will result in a total prize of $8.00, although this information is not displayed to Alice.

Alice initially decides to play a slot-machine type game. An electronic representation of a slot machine is displayed on her PC, and she decides to wager $0.25 on each play of the slot machine. Alice's PC allocates the $8.00 outcome amount among twenty events ($5.00/$0.25) using a random process. Because Alice had indicated that she preferred to win a smaller number of large prizes, her PC randomly determines that the sixth event and the twelfth event will each be associated with a $4.00 prize and that the other events will be associated with no prizes. If Alice had instead indicated that she preferred to win a larger number of smaller prizes, her PC may have instead selected, for example, eight events to be associated with $1.00 each.

Alice plays the slot machine five times, and each time the slot machine reels indicate that no prize is won. Note that at this point, she has wagered a total of $1.25 and thus has $3.75 worth of event wagers remaining (and the total outcome associated with those wagers is still $8.00).

She decides to try another game, and selects a hidden-treasure maze game. In this type of game, the player maneuvers around the maze looking for boxes. Each time the player finds and opens a box another event result is revealed. Alice indicates that her remaining events should be used to place five boxes in the maze. Her PC determines that each box is associated with a $0.75 wager ($3.75/5) and re-allocates the remaining event outcomes (still $8.00) as follows: $4.00, $0.00, $4.00, $0.00, and $0.00. When Alice finds the first box, $4.00 is applied to her credit card account. Alice finds one more box and decides to stop playing the game. Her PC transmits information to the lottery service indicating that she has not yet wagered $2.25 and has not yet received $4.00 of her outcome amount.

Alice later access the lottery service using her wireless telephone. She indicates that she would like to receive and play five electronic instant lottery scratch-off tickets. The lottery services determines that each ticket will be associated with a $0.45 wager ($2.25/5) and allocates her remaining $4.00 outcome amount as follows: $0.00, $0.00, $3.00, $0.00, and $1.00. Alice plays all five tickets and another $4.00 is applied to her credit card account.

Gaming System

Figure 2:
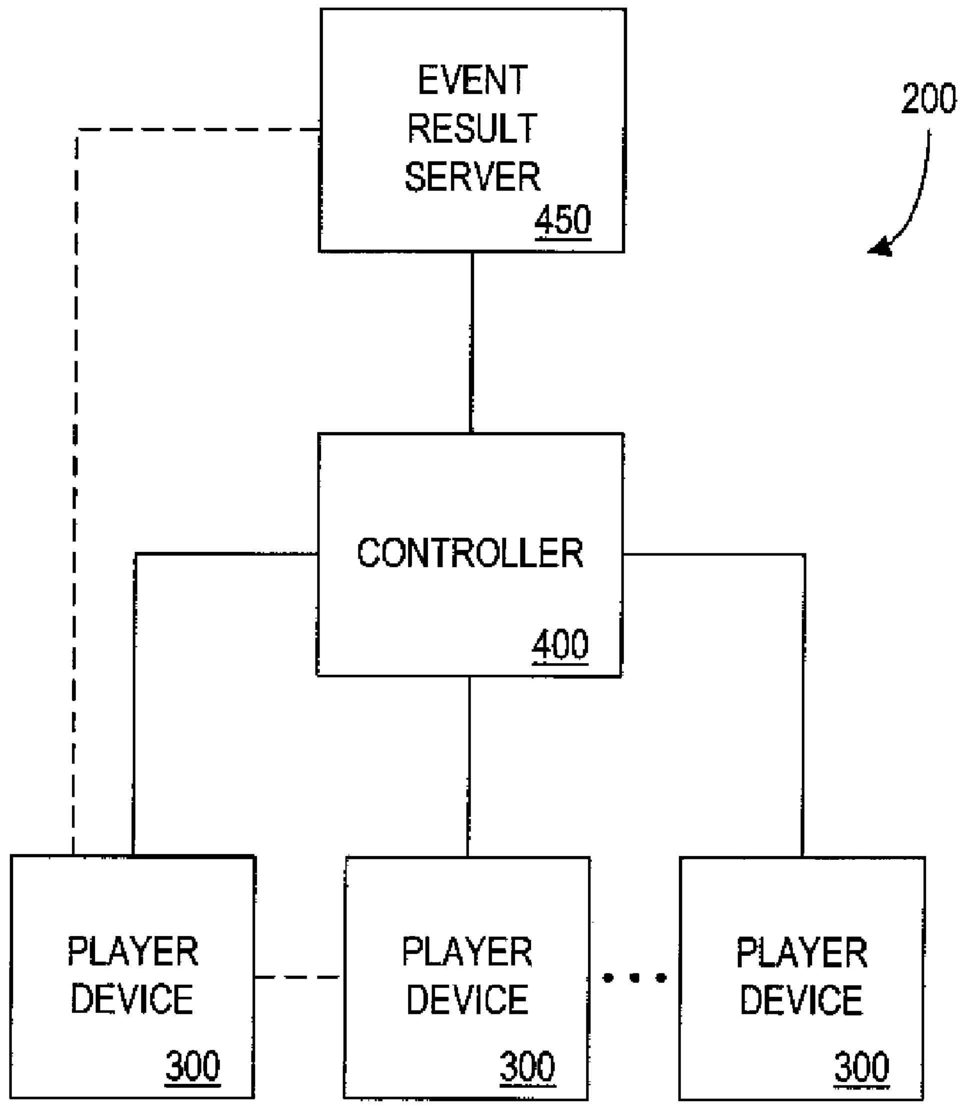
FIG. 2 is a block diagram overview of a gaming system according to an embodiment of the present invention.

Turning now in detail to the drawings, FIG. 2 is a block diagram overview of a gaming system 200 according to one embodiment of the present invention. As will be described, the gaming system 200 may be used to provide event results to a player. The gaming system 200 includes a controller 400 in communication with an event result server 450 and a number of player devices 300. As used herein, devices (such as the event result server 450, the player devices 300, and/or the controller 400) may communicate, for example, via a communication network, such as a Local Area Network (LAN), a Metropolitan Area Network (MAN), a Wide Area Network (WAN), a Public Switched Telephone Network (PSTN), a Wireless Application Protocol (WAP) network, or an Internet Protocol (IP) network such as the Internet, an intranet or an extranet. Moreover, as used herein, communications include those enabled by wired or wireless technology. Note that although a single controller 400 is shown in FIG. 2, any number of controllers 400 may be included in the gaming system 200. Similarly, any number of the other devices described herein may be included in the gaming system 200 according to embodiments of the present invention.

In one embodiment of the present invention, the player device 300 communicates with a remote, Web-based controller 400 (e.g., a server) through the Internet. Although some embodiments of the present invention are described with respect to information exchanged using a Web site, according to other embodiments information can instead be exchanged, for example, via: a telephone, an Interactive Voice Response Unit (IVRU), electronic mail, a WEBTV® interface, a cable network interface, and/or a wireless communication system.

The event result server 450 may be any device capable of performing the functions described herein. For example, the event result server 450 may be a PC associated with a state lottery and configured to generate and/or transmit event results or a total payout amount.

Similarly, the controller 400 and the player devices 300 may be any device capable of performing the functions described herein. The player device 300 may be, for example: a PC, a portable computing device such as a PDA, a wired or wireless telephone, a one-way or two-way pager, a kiosk (e.g., an instant lottery kiosk located at an airport terminal), an ATM device, a POS terminal, a game terminal (e.g., a video poker terminal), a smart card, or any other appropriate storage and/or communication device.

Note that the player device 300 need not be in constant communication with the controller 400. For example, the player device 300 may only communicate with the central controller 400 via the Internet when appropriate (e.g., when attached to a "docking" station or "cradle" coupled to the player's PC). The player device 300 may also communicate with the controller 400 via an Infra Red (IR) port when near a kiosk located in a merchant's store.

Any of the event result server 450, the player device 300, and/or the controller 400 may be incorporated in a single device (e.g., a kiosk located in a merchant's store may act as both a player device 300 and a controller 400).

According to an embodiment of the present invention, the player device 300 may receive from a player an indication associated with at least one player-established event parameter. The player-established event parameter may be, for example, (i) a total wager amount, (ii) an indication associated with a total number of events (e.g., an indication associated with the total number of events or a total time period), and/or (iii) an event wager amount associated with each of the total number of events. The player may, for example, enter a value (e.g., by typing "$5.00" on a keyboard) or select a value from a set of predetermined values (e.g., by using a mouse to highlight and indicate "ten minutes" from a displayed list of "five minutes," "ten minutes," or "thirty minutes").

Based on the player-established event parameter, at least one other event parameter may be determined by the gaming system 200. For example, the player device 300 or the controller 400 may calculate an event parameter based on the player-established event parameter. Consider a player who uses his or her player device 300 (e.g., his or her wireless telephone) to register with a game service (e.g., associated with the controller 400). The player indicates that he or she wishes to receive thirty dollars worth of game play (i.e., the total wager amount equals thirty dollars), and the player device 300 transmits a request to the controller 400 along with a payment identifier (e.g., a credit card number or other indication associated with a financial account). Note that the player device 300 may instead communicate directly or indirectly with the event result server 450 (as shown by a dashed line in FIG. 2). Similarly, a player device 300 may communicate directly or indirectly with another player device (e.g., to transfer wager amounts and/or event results or to play a game involving multiple players).

According to one embodiment, the controller 400 arranges for the player to provide payment of the total wager amount using the payment identifier The controller 400 may also determine a total payout amount and/or a number of individual event payout amounts based on the total wager amount. For example, the controller 400 may initiate a random number generation process and determine that the player will win twenty-five dollars based on a thirty dollar total wager amount. According to another embodiment, the player device 300 itself generates a total payout amount and/or a number of individual event payout amounts.

According to another embodiment, the controller 400 receives a set of predetermined event results from the event result server 450. For example, the controller 400 may receive the following set of event payout amounts from the event result server 450; 0, 0 , 0, +1, 0, 0, +5, 0, 0, . . . 0. Note that an event result may represent, for example, whether a player has won (e.g., whether the player has, or has not, won a new automobile), a specific dollar amount, or a percentage of an event wager amount. Also note that an event result may represent a negative amount (e.g., the player will lose five dollars as a result of this event).

The set of predetermined event results may be, for example, received by the controller 400 on a periodic or non-periodic basis (e.g., by receiving a batch of results once each week, or by receiving a batch of ten thousand event results when the controller 400 has less than one thousand event results remaining). The set may also be provided to the controller 400 in response to a player's purchase (e.g. the event result server 450 may transmit thirty event results to the controller 400 after the player has paid for thirty event results) or a player's game play (e.g., the event result server 450 may transmit an event result to the player device 300 when it is to be revealed to the player). According to still another embodiment, a set of event results is pre-stored on the player device 300 (e.g., in an encrypted format) and individual event results are "unlocked" and revealed to the player in response to receipt of payment.

According to one embodiment, the controller 400 transmits a set of event results to the player device 300. According to another embodiment, either the event result server 450 or the controller 400 determines a total payout amount based on a set of event results (e.g., by calculating the total of each event payout amount). An indication associated with the total payout (e.g., twenty-five dollars) is then transmitted to the player device 300.

For example, a player may use the player device 300 to indicate that he or she wishes to pay thirty dollars (i.e., the total wager amount) and play one hundred electronic scratch-off instant lottery games (i.e., the total number of events is one hundred). In this case, the player device 300 may determine that the event wager amount is $0.30 (i.e., thirty dollars divided by one hundred). That is, each of the one hundred lottery games are associated with a $0.30 wager.

According to another embodiment, the one hundred lottery games are not associated with identical event wager amounts. For example, the player and/or the gaming system 200 may determine that the player will receive fifty event results associated with a $0.20 event wager amount and fifty event results associated a $0.40 event wager amount (still representing a thirty dollar total wager amount) According to one embodiment, the player device 300 also determines an event payout amount for each of the one hundred events. For example, the player device 300 may randomly allocate a twenty-five dollar total payout amount (e.g., based on an indication received from the controller 400) among the one hundred lottery games.

The player device 300 may also be used to indicate (e.g., to display, reveal, and/or transmit) each of the event results to the player. For example, the player may play a card game on the player device 300, and the result of the card game may reveal an event payout amount. The controller 400 may also arrange for the player to receive payment of, for example, an event payout amount or the total payout amount using the player's payment identifier.

Player Device

Figure 3:
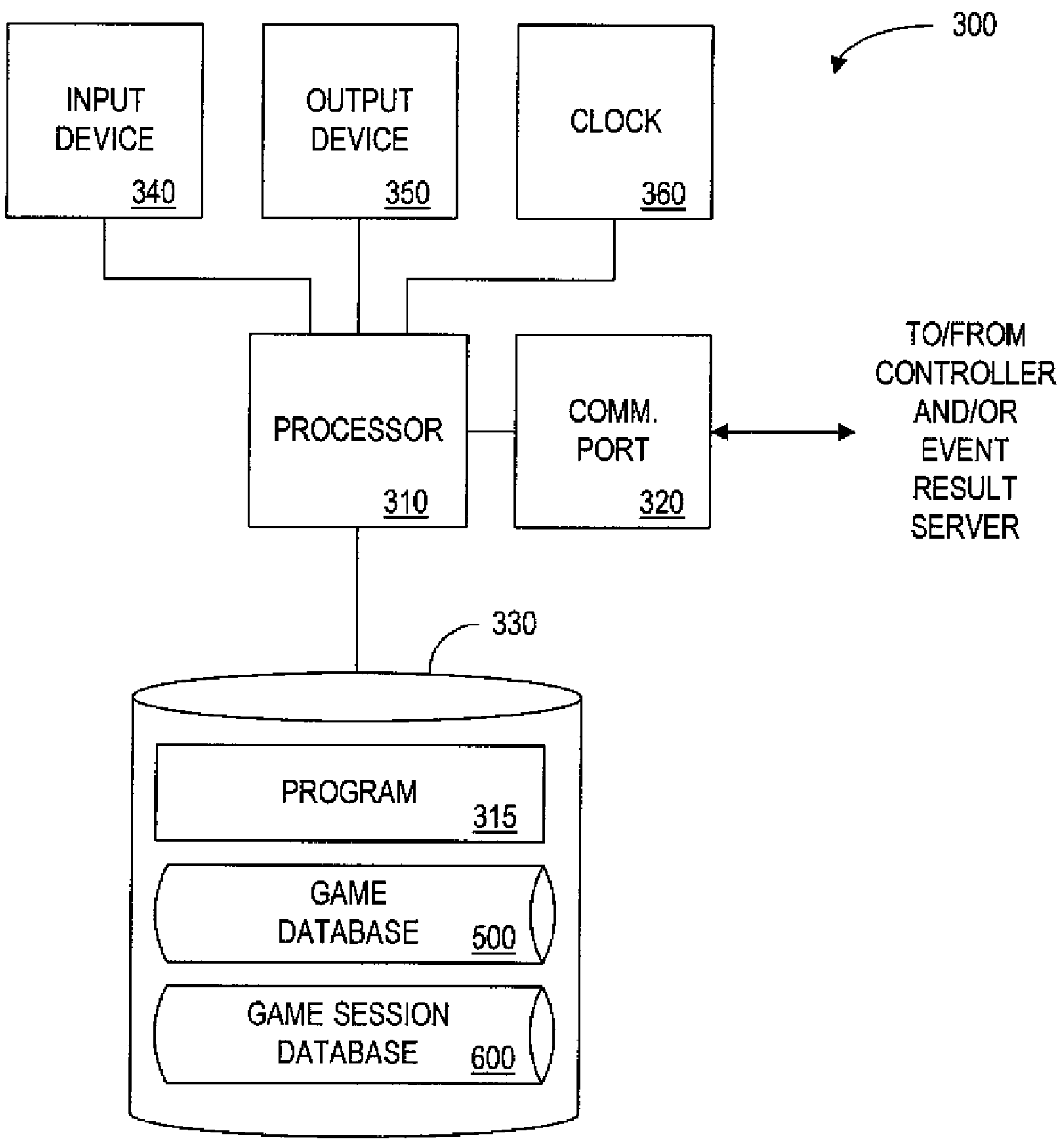
FIG. 3 is a block schematic diagram of a player device according to an embodiment of the present invention.

FIG. 3 illustrates a player device 300 that is descriptive of the device shown in FIG. 2, according to an embodiment of the present invention. The player device 300 comprises a processor 31 0, such as one or more INTEL® Pentium® processors, coupled to a communication port 320 configured to communicate via a communication network (not shown in FIG. 3). The communication port 320 may be used to communicate, for example, with an event result server 450 and/or a controller 400. The processor 310 also communicates with a clock device 360, such as to determine a current time or a time period.

The processor 310 is also in communication with an input device 340. The input device 340 may comprise, for example: a keyboard, a mouse or other pointing device, a microphone, a knob or a switch (including an electronic representation of a knob or a switch), and/or a touch screen. The input device 340 may be used, for example, to receive an indication associated with an outcome allocation preference from a player. The input device 340 may also be used by a player to play a game (e.g., by manipulating electronically represented playing cards) during which, or after which, one or more event results are revealed.

The processor is also in communication with an output device 350. The output device 350 may comprise, for example: a display screen, a speaker, and/or a printer. The output device 350 may be used, for example, to indicate a series of event payout amounts to a player.

The processor 310 is also in communication with a storage device 330. The storage device 330 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 330 stores a program 315 for controlling the processor 310. The processor 310 performs instructions of the program 315, and thereby operates in accordance with the present invention. For example, the processor 310 may determine an outcome amount associated with a total number of events and, based on a parameter associated with a player, allocate the outcome amount among the total number of events.

The program 315 may be stored in a compressed, uncompiled and/or encrypted format. The program 315 may furthermore include other program elements, such as an operating system, a database management system, and/or "device drivers" used by the processor 310 to interface with peripheral devices. Such program elements are known to those skilled in the art.

As used herein, information may be "received" by or "transmitted" to, for example: (i) the player device 300 from the event result server 450, or the controller 400; or (ii) a software application or module within the player device 300 from another software application, module, or any other source.

As shown in FIG. 3, the storage device 330 also stores a game database 500 (described with respect to FIG. 5) and a game session database 600 (described with respect to FIG. 6). According to another embodiment, the storage device 300 also stores a database similar to the one described with respect to FIG. 8. Such a database may be used, for example, to store and/or reveal event results received from the controller 400.

Figure 11:
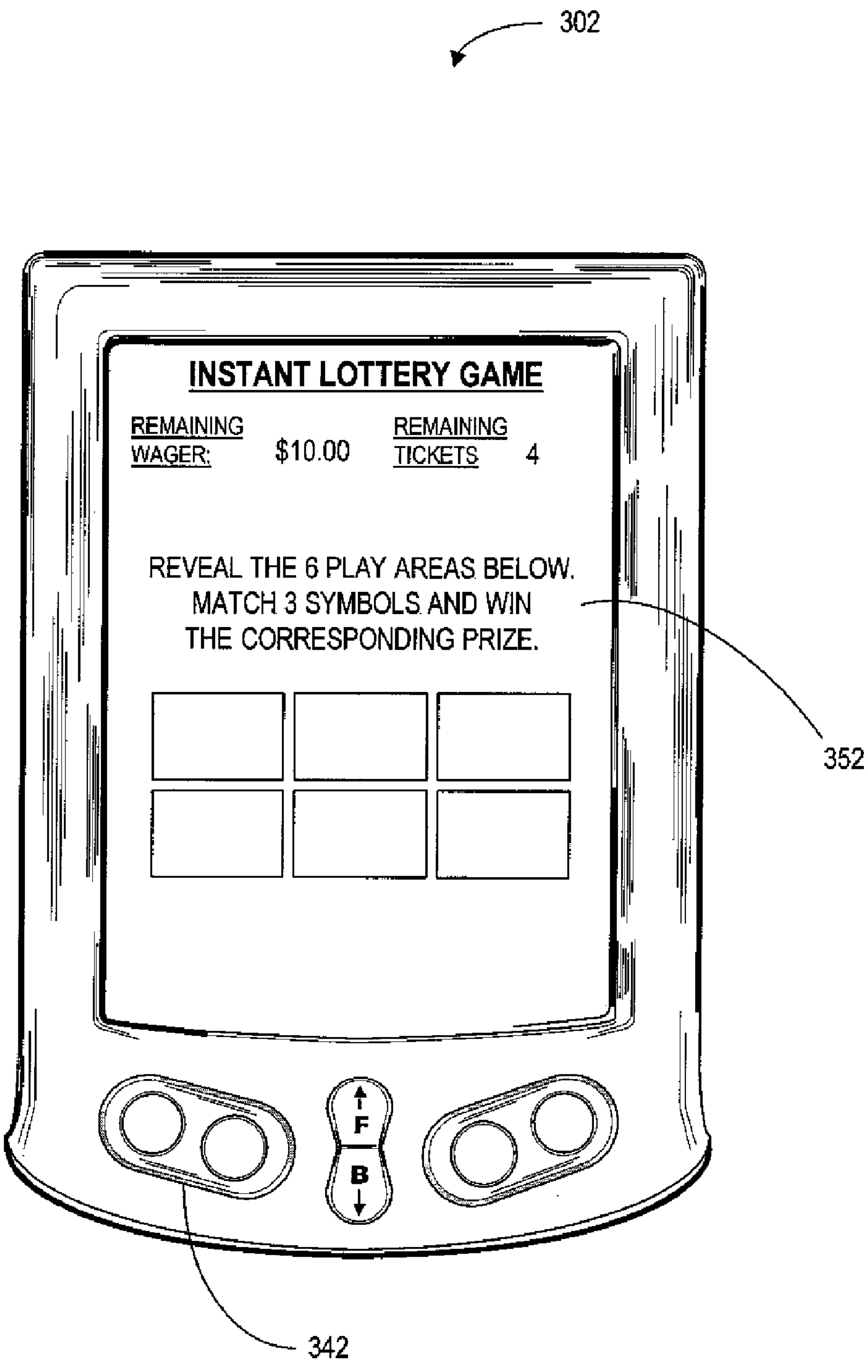
FIG. 11 illustrates a PDA displaying information according to an embodiment of the present invention.

FIG. 11 illustrates an embodiment of the present invention wherein the player device 300 is a PDA 302. The PDA 302 includes an output device 352 (e.g., a display screen) that may be used to display one or more event results to a player. The PDA 302 also includes an input device 342 that may be used by the player to input one or more player-established event parameters (e.g., an outcome allocation preference) and/or to play a game (e.g., a game during which event results are revealed).

Figure 12A:
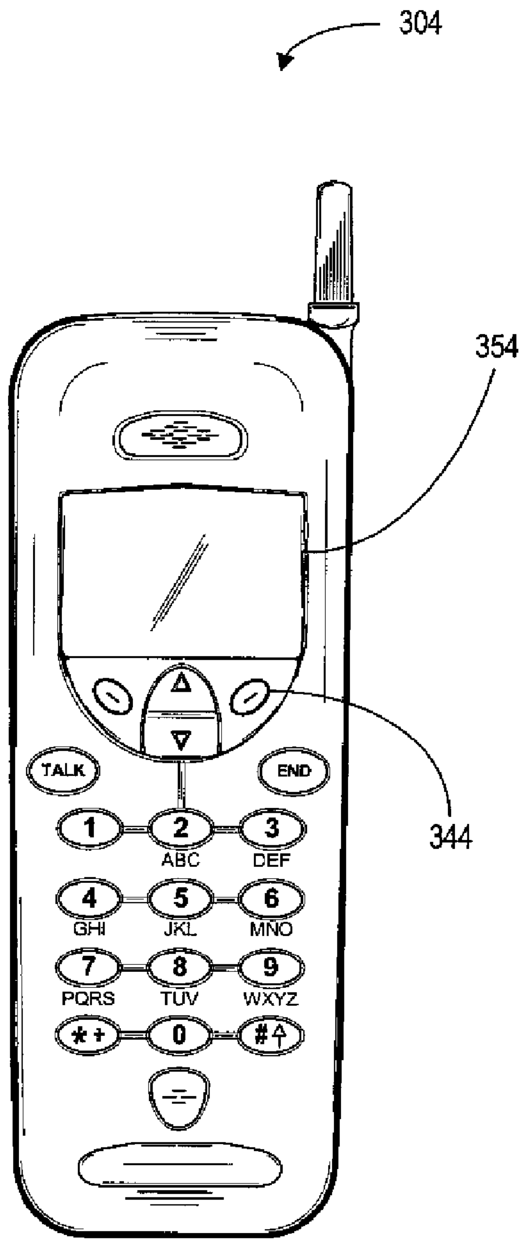
FIG. 12A and 12B illustrate a wireless telephone displaying information according to an embodiment of the present invention.
Figure 12B:
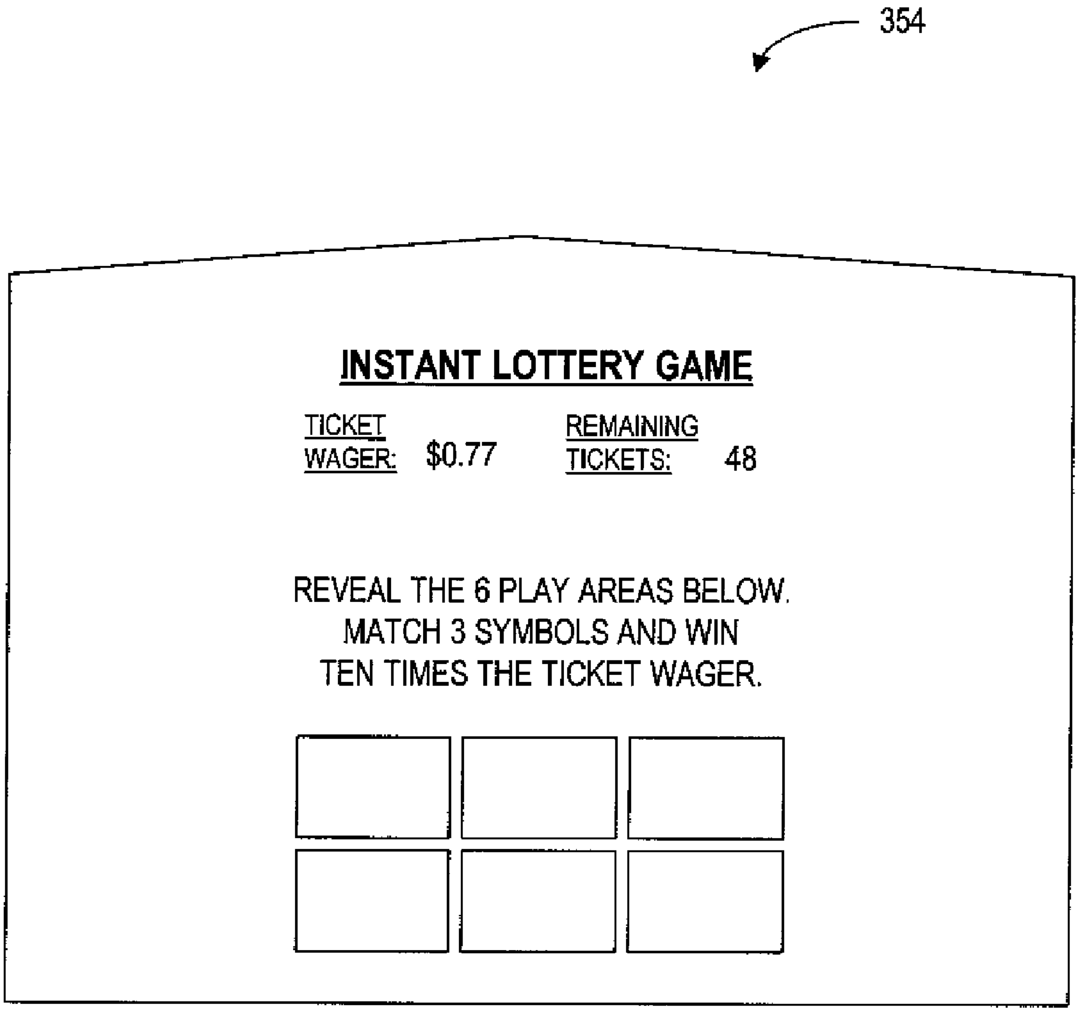

FIGS. 12A and 12B illustrates an embodiment of the present invention wherein the player device 300 is a wireless telephone 304. The wireless telephone 304 includes an output device 354 (e.g., a display screen) that may be used to display one or more event results to a player. The wireless telephone 304 also includes an input device 344 that may be used by the player to input one or more player-established event parameters (e.g., an outcome allocation preference) and/or to play a game (e.g., a game during which event results are revealed).

Controller

Figure 4:
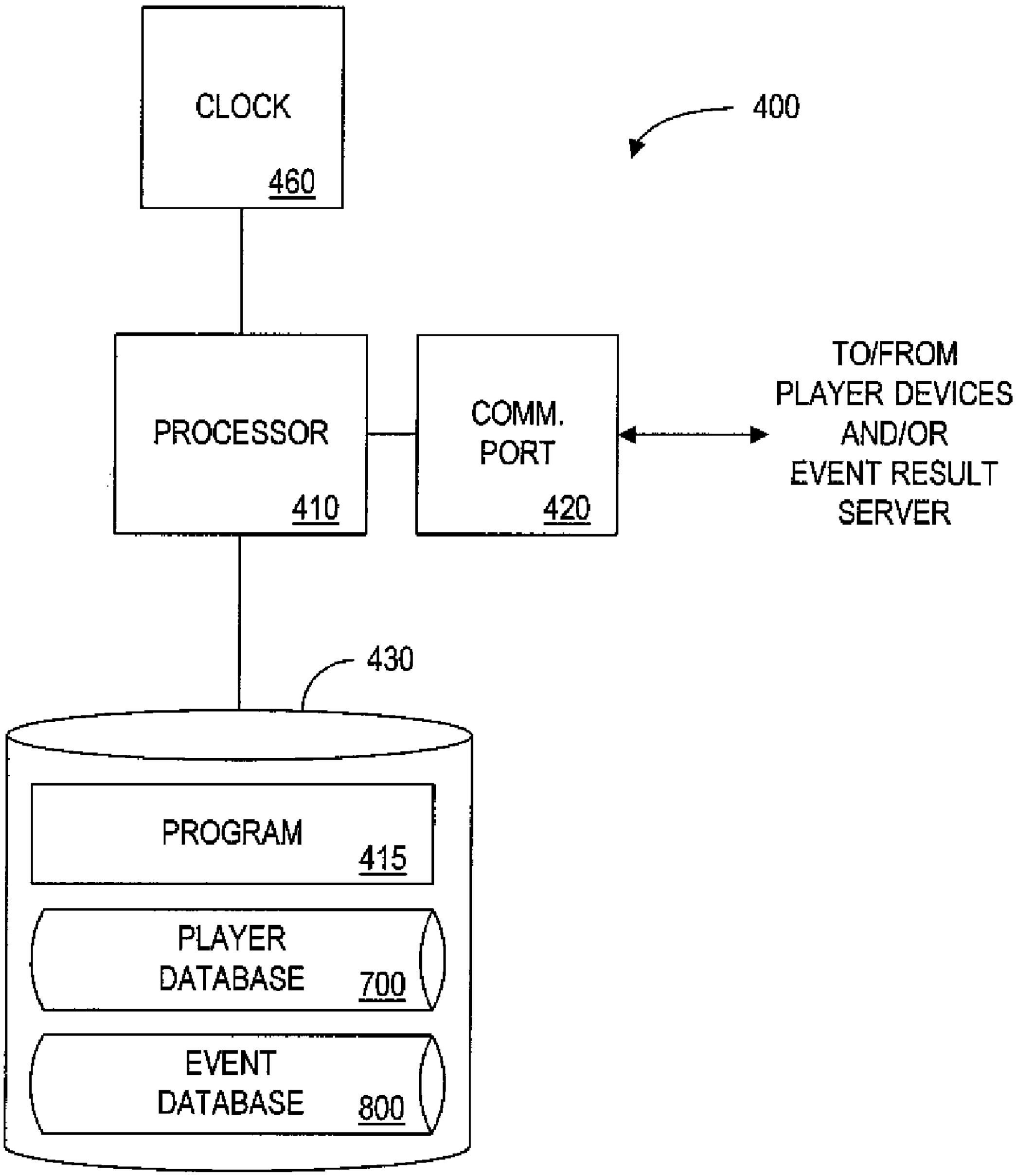
FIG. 4 is a block schematic diagram of a controller according to an embodiment of the present invention.

FIG. 4 illustrates a controller 400 that is descriptive of the device shown in FIG. 2, according to an embodiment of the present invention. Note that the event result server 450 may contain similar elements and/or perform similar functions as those described herein with respect to the controller 400.

The controller 400 comprises a processor 410, such as one or more INTEL® Pentium®D processors, coupled to a communication port 420 configured to communicate via a communication network (not shown in FIG. 4). The communication port 420 may be used to communicate, for example, with an event result server 450 and/or one or more player devices 300. The processor 410 also communicates with a clock device 460, such as to determine a current time or a time period.

The processor 410 is also in communication with a storage device 430. The storage device 430 may comprise any appropriate information storage device, including combinations of magnetic storage devices (e.g., magnetic tape and hard disk drives), optical storage devices, and/or semiconductor memory devices such as RAM devices and ROM devices.

The storage device 430 stores a program 415 for controlling the processor 410. The processor 410 performs instructions of the program 215, and thereby operates in accordance with the present invention. For example, the processor 410 may determine an outcome amount associated with a total number of events and, based on a parameter associated with a player, allocate the outcome amount among the total number of events.

The program 415 may be stored in a compressed, uncompiled and/or encrypted format. The program 415 may furthermore include other program elements, such as an operating system, a database management system, and/or "device drivers" used by the processor 410 to interface with peripheral devices. Such program elements are known to those skilled in the art.

As used herein, information may be "received" by or "transmitted" to, for example: (i) the controller 400 from the event result server 450 or one or more player devices 400; or (ii) a software application or module within the controller 400 from another software application, module, or any other source.

As shown in FIG. 4, the storage device 430 also stores a player database 700 (described with respect to FIG. 7) and an event database 800 (described with respect to FIGS. 8A through 8C).

Examples of databases that may be used in connection with the gaming system 200 will now be described in detail with respect to FIGS. 5 through 8. The schematic illustrations and accompanying descriptions of the databases presented herein are exemplary, and any number of other database arrangements could be employed besides those suggested by the figures.

Game Database

Referring to FIG. 5, a table represents the game database 500 that may be stored at a player device 300, according to an embodiment of the present invention. According to another embodiment, all or some of the information in the game database 500 may instead be stored at the controller 400. The table includes entries identifying games that can be played by a player. The table also defines fields 502, 504, 506, 508, 510, 512, 514, 516 for each of the entries. The fields specify: a game identifier 502; an event format name 504; an event format description 506; an event duration type 508; an average time per event 510 ; a payout percentage 512; a total number of events 514; and a number of remaining events 516. The information in the game database 500 may be created and updated, for example, based on information received from the player and/or the controller 400.

The game identifier 502 may be, for example, an alphanumeric code associated with a game that can be played by a player. For each game, the game database 500 also stores the event format name 504 and the event format description 506 that describes the game. The event format name 504 may be, for example, displayed to and/or selected by a player. The event format description 506 may comprise, for example, any text, image, and/or audio information associated with the game (e.g., information that may be provided to the player via the player device 300). According to one embodiment, the event format description 506 also includes rules, instructions, and/or parameters used by a game program or module executed by the player device 300. For example, the event format description 506 may comprise a Java applet that can be executed by the player device 300.

The event duration type 508 may indicate if the game is associated with a "variable" time period (e g., a card game played by a player) or a "fixed" time period (e.g., a slot machine game). The average time per event 510 indicates how many event results are revealed to a player, on average, during a given time period. For example, as shown by the second entry in FIG. 5, the "auto racing" game displays one event result to a player, on average, every thirty seconds. The average time per event 510 may be based on an average associated with a number of players (e.g., a sample of players who have played the game) or with a particular player (e.g., representing how long it actually took to reveal one or more event results to that particular player). The average time per event 5 1 0 may be used, for example, to calculate the total number of events 514 based on a player-established total time period. According to another embodiment, a minimum time per event (not shown in FIG. 5) is stored in the game database 500 in addition to, or in place of the average time per event 510.

The payout percentage 512 is associated with an expected return based on a total wager amount and/or an event wager amount. For example, a player who wagers $100 in the "auto racing" game will, on average, win $48.00. The payout percentage 512 may be used, for example, to determine a total payout amount based on a player-established total wager amount.

According to another embodiment, the payout percentage 512 is used to determine the total wager amount based on a player-established total payout amount. For example, the player may indicate that he or she wants to purchase $50.00 worth of winning event results. The player device 300 may then calculate, based on a random outcome and the payout percentage 512, that the player will pay $56.00 for a set of event results that contain $50.00 worth of winning event results. In this case, the player may be required to provide payment or a guarantee or payment of the total wager amount before he or she receives an indication associated with the total outcome amount.

The total number of events 514 represents how many event results will be indicated to the player. The number of remaining events 516 indicates how many of the total number of events 514, which have already been purchased by the player, do not correspond to an associated event result having been revealed to the player (e.g., the player has not yet "played" those events). The number of remaining events 516 may be used, for example, to allocate an outcome amount among those events as appropriate.

Game Session Database

Referring to FIG. 6, a table represents the game session database 600 that may be stored at a player device 300 (e.g., the particular player device 300 associated with a particular player terminal identifier), according to an embodiment of the present invention. According to another embodiment, all or some of the information in the game session database 600 may instead be stored at the controller 400. The table includes entries identifying game sessions (e.g., a game session associated with a set of event results) that have been played, or are being played, by a player The table also defines fields 602, 604, 606, 608, 610, 612, 614, 616, 618 for each of the entries. The fields specify: a game session identifier 602; a game identifier 604; a total time period 606; an average time per event 608; a time remaining 610; a total wager amount 612; a wager balance amount 614; a cumulative payout amount 616; and a session status 618. The information in the game session database 600 may be created and updated, for example, based on information received from a player device and/or the controller 400.

The game session identifier 602 may be, for example, an alphanumeric code associated with a game session. The game identifier 604 may be, for example, an alphanumeric code associated with a particular game and may be based on, or associated with, the game identifier 502 stored in the game database 500.

For each game session, the game session database 600 also stores the total time period 606 associated with the game session (e.g., an amount of time that the game session will take). The time remaining 61 0 indicates how much more time is left in the game session, and the average time per event 608 indicates an amount of time that, on average, it has taken for a game result to be indicated to the player during the game session.

The total event wager amount 612 indicates an amount of money that the player has provided in exchange for the game session (e.g., an amount the player has wagered with respect to the total number of events). The wager balance amount 614 indicates an amount of money that the player has available (e.g., has not yet wagered). The cumulative payout amount 616 indicates the sum of the allocated event payout amounts that have been won by the player during the game session. That is, when all of the allocated event payout amounts associated with the game session have been indicated to the player, the cumulative payout amount 616 will represent the total payout amount.

The session status 618 represents if, for example, a game session is "outstanding" (e.g., at least some of the allocated event results associated with the game session have not yet been indicated to the player) or "complete" (e.g., all the allocated event results associated with the game session have been indicated to the player). A game session may be "outstanding" when, for example, the game session is currently being played by the player or has been temporarily suspended by the player (e.g., the player has "paused" the game session).

Player Database

Referring to FIG. 7, a table represents the player database 700 that may be stored at the controller 400, according to an embodiment of the present invention. According to another embodiment, all or some of the information in the player database 700 may instead be stored at the player device 300. The table includes entries identifying players who have registered to use the gaming system 200. The table also defines fields 702, 704, 706, 708, 710, 712, 714 for each of the entries. The fields specify: a player identifier 702; a name 704; an address 706; a terminal identifier 708; a terminal address 710; payment information 712; and distribution preference 714. The information in the player database 700 may be created and updated, for example, based on information received from the player device 300.

The player identifier 702 may be, for example, an alphanumeric code associated with a player who has registered to use the gaming system 200. The player identifier 702 may be generated by, for example, the controller 200 or the player (e.g., when the player provides a user name and password). The player database 700 also stores the name 704 and the address 706 associated with each player.

The terminal identifier 708 and the terminal address 710 may indicate, for example, a specific player device 300 associated with the player. The terminal address 710 may be, for example, an IP address or any other information that can be used to transmit information to the player device 300.

The payment information 712 may comprise, for example, a credit card, debit card or bank account number (e.g., a checking account number) or digital payment protocol information. The payment information 712 may be used, for example, by the controller 200 to arrange for the player to provide payment of the total wager amount and to receive payment of the total payout amount.

The distribution preference 714 may indicate, for example, one or more ways in which a player prefers to have an outcome amount distributed among events. The distribution preference 714 may indicate a player's magnitude or frequency preferences. For example, the distribution preference 714 may indicate that a player prefers "larger prizes" (e.g., less frequent but larger prizes) or "frequent prizes" (e.g., more frequent but smaller prizes). The distribution preference 714 may also indicate, for example, a payout location preference. For example, a player may indicate that he or she prefers to receive more prizes towards then end of a series of events or that smaller outcome amounts should always by revealed prior to larger outcome amounts.

Event Database

Referring to FIG. 8A, a table represents a record of the event database 800 that may be stored at the controller 400, according to an embodiment of the present invention. According to another embodiment, all or some of the information in the event database 800 may instead be stored at the player device 300 and/or the event result server 450. The information in the event database 800 may be initially created, for example, based on information received from the event result server 450. The information may then be updated, for example, when the controller 400 re-allocates outcome amounts among events.

The table includes a record for each game session played by a player. The game session identifier 802 may be, for example, an alphanumeric code associated with a game session and may be based on, or associated with, the game session identifier 602 stored in the game session database 600.

The table also defines fields 804, 806 for each event associated with the game session. The fields specify an event identifier 802 and an event result 806 associated with an event. The event result 806 may represent, for example, an event payout amount (e.g., as a dollar amount or as a percentage of the event wager amount) associated with the event.

The game session shown in FIG. 8A is associated with six events having the following event results 806: 0, 0, +5, 0, +1, and 0. Thus, the total outcome amount associated with this game session is ÷6.

FIG. 8B shows these event results 806 of FIG SA re-allocated among a larger number of events. In particular, the total number of events has increased to nine, and the event results 806 have been re-allocated as follows: 0, +1, 0, +1, +1, 0, +2, 0, and +1. Note that the total outcome amount associated with the game session is still +6.

The event results 806 may be re-allocated in any of a number of different ways. According to one embodiment, the original two event results are merely positioned among the modified number of events (e.g., the +5 and the +1 are randomly positioned among the nine events, with the other seven events being 0). According to another embodiment, a subset of the modified number of events are initially determined. For example, the first, fourth, fifth, and eighth events may be randomly selected from the nine events. In this case, the event results 806 may be re-allocated among that subset. The event results 806 may be, for example, equally allocated (e.g., each of the four positions in the subset may receive +1.5 for a total of +6) or randomly allocated (e.g., the events in the first, fourth and fifth position receive +1, while the event in the eighth position receives +3, for a total of +6).

FIG SC shows the event results of FIG. 8B re-allocated among a smaller number of events. In particular, the total number of events has decreased to three, and the event results have been re-allocated as follows: +3, 0, and +3. The total outcome amount associated with the game session is still +6. According to another embodiment, the first three event results 806 of FIG. 8B may be associated with the first event result 806 of FIG. SC, the next three event results 806 of FIG. 8B may be associated with the second event result 806 of FIG. 8C, and the last three event results 806 of FIG. 8B may be associated with the third event result 806 of FIG. SC. In this case, the three event results 806 in FIG. 8C would comprise: +1, +2, and +3.

According to one embodiment, the event results 806 being re-allocated include both positive and negative values. In this case, the event results 806 may be re-allocated among the modified number of events using both positive and negative values (e.g., such that the total outcome amount remains the same).

According to another embodiment, an original series of event results 806 include only positive values, but are re-allocated among a modified number of events using both positive and negative values. Consider, for example, the following original series of five event results 806: 0, 0, 0, 1, and 0. These event results may be re-allocated among ten event results 806 as follows: +5, 0, −10, +1, +5, +10, 0, −10, −10, and +15. Such an approach may increase a player's level of interest in a game as the event results 806 are revealed during play. Note that the gaming system 200 may even re-allocate an original number of event results 806 among the same number of event results 806 in this way.

Note that when the original or modified event results 806 include negative values, a player may be obligated to receive a complete series of event results 806. That is, a player who stops in the middle of the series may have a current outcome amount that is greater than the total outcome amount. According to one embodiment, a player may be periodically allowed to stop receiving event results 806. Consider, for example, a player who originally purchases ten event results 806, each having either a zero or a positive value. The gaming system 200 re-allocates the ten events results 806 among forty event results 806, using both positive and negative values, as follows: the first of the original ten event results 806 is allocated among the first four of the forty event results 806, the second of the original ten event results 806 is re-allocated among the fifth through eighth of the forty event results 806, etc. In this case, the player may be allowed to stop playing after receiving the fourth event result 806, after the eighth event result 806, etc.

According to one embodiment of the present invention, an original series of event results 806 comprises values within a predetermined range, and is re-allocated among a modified series of event results 806 using values outside that predetermined range. For example, an original series of event results 806 that comprises values from 0 to +1, may be re-allocated among a modified series of event results 806 using values from 0 to +5.

Methods that may be used in connection with the gaming system 200 according to an embodiment of the present invention will now be described in detail with respect to FIGS. 9 and 10.

Gaming System Methods

Figure 9:
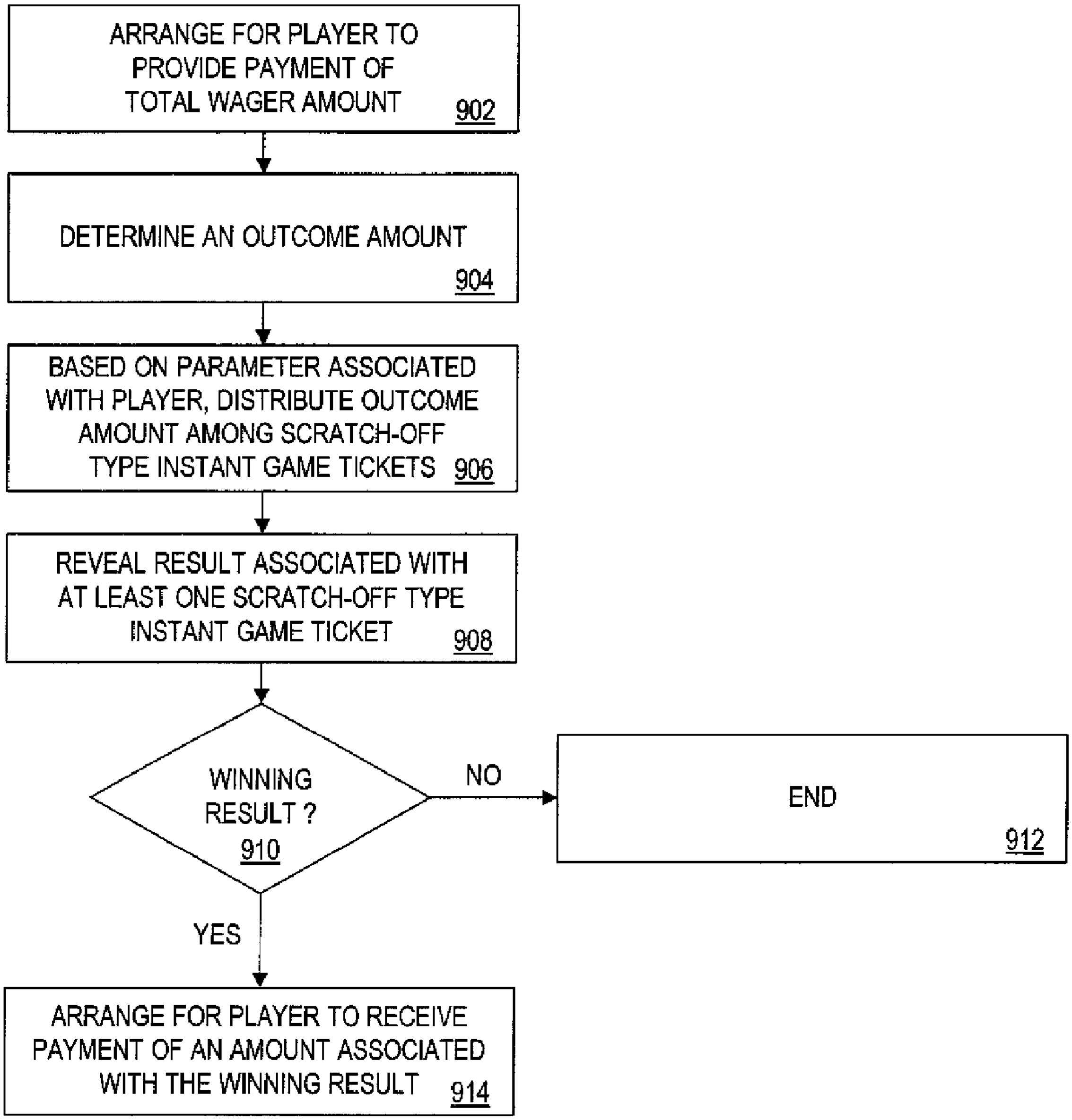
FIG. 9 is a flow chart of a method according to an embodiment of the present invention.

FIG. 9 is a flow chart of a method for operating the gaming system 200, according to an embodiment of the present invention. The method may be performed, for example, by one or more of the event result server 450, the player device 300, and/or the controller 400. The flow chart in FIG. 8, as well as the other flow charts discussed herein, does not imply a fixed order to the steps, and embodiments of the present invention can be practiced in any order that is practicable.

At 902, it is arranged for a player to provide payment of a total wager amount. This may be performed, for example, using a payment identifier associated with the player (e.g., a credit card number, a debit card number, and/or a checking account number).

For example, a player may enter his or her credit card number at a lottery kiosk located at a merchant's store. The kiosk may then use the credit card number to receive payment of a total wager amount (e.g., as selected by the player from a list of possible total wager amounts) and transmit an indication associated with a total outcome amount to the player's PDA lottery device. The indication associated with the total outcome amount may be encoded or encrypted such that the player cannot readily determine if the total outcome amount is more than his or her wager amount. In this case, the player may be allowed to "return" any unused lottery events (e.g., by returning to the kiosk). According to one embodiment, a player may can "subscribe" to such a lottery service. In this case, the payment identifier can be stored at the controller 400 and used to periodically receive payment from the player.

According to another embodiment, the player uses his or her PC as a lottery device and communicates with the controller 400 via a lottery Web site. In this case, various player preferences (e.g., one or more outcome allocation preferences) and/or the payment identifier may be stored as a "cookie," or block of data that a Web server (e.g., the controller 400) stores on a client system (e.g., the player's PC). When the player returns to the lottery Web site, or an associated Web site, the browser of the player's PC sends a copy of the cookie back to the Web server. Cookies may be used to identify players associated with a player device 300, to instruct the Web server to send a customized version of a Web page, and for other purposes.

At 904, an outcome amount is determined for the player. For example, gaming system 200 may retrieve the outcome amount from a database, randomly determine the outcome amount, or calculate the outcome amount based on information received from the event result server 450.

At 906, the outcome amount is distributed among a number of electronic scratch-off type instant game tickets based on a parameter associated with the player. For example, the player may provide an indication that he or she wishes to wager a total of five dollars. The player may also indicate that he or she wishes to receive two hundred events. In this case, the gaming system 200 may, at 906, calculate that each of the event wager amounts is equal to the total wager amount divided by the total number of events (i e., is equal to five dollars divided by two hundred, or 2.5 cents). The gaming system 200 similarly determine that the outcome amount associated with the player's wager is three dollars. The gaming system 200 would then allocated this outcome amount among the two hundred events.

In general, the allocation performed at 906 may be based on, for example, an indication associated with the event parameter established by a player (e.g., the player indicates that he or she wants to receive only one dollar prizes) or a stored value (e.g., a roulette-wheel type game is always associated with a ten dollar total prize).

For example, the outcome amount may be allocated by calculating an event outcome amount based on the total outcome amount and a total number of winning events. For example, each winning event may be associated with an equal event outcome amount. In this case, the event outcome amount may be based on the total outcome amount divided by the total number of winning events. Similarly, the total number of winning events may be calculated by dividing the total outcome amount by the event outcome amount.

According to another embodiment, different events may be associated with different event outcome amounts. In this case, the total outcome amount may be allocated among the total number of events in any of a number of different ways. For example, a predetermined formula or event outcome amount table may indicate that the size of the event outcome amounts should increase during play (e.g., to increase the player's level of interest). The size of the event outcome amounts may increase, for example, in a linear or exponential fashion. The size of the outcome wager amounts may instead change in steps (e.g., the first seventy percent are nickel prizes, the next twenty percent are dime prizes, and the last ten percent are quarter prizes) or actually decrease in value. Other event outcome amount formulas, such as a formula based on a desired standard deviation associated with the event outcome amounts, can also be used.

According to another embodiment, the allocation of the total outcome amount among the total number of events is also based on a player allocation parameter. For example, a player may indicate that he or she prefers to have a few "jumbo" event amount amounts allocated among the total number of events, or that all event outcome amounts should be within twenty percent of an average event outcome amount.

According to one embodiment, the gaming system 200 may also determine the total number of events based on the allocation of the outcome amount. Consider a player who has selected an event format that only provides three different event payout amounts: $0.00, $100 and $5.00 (i.e., an event payout amount cannot have another value such as $3.00). Assume also that the player purchases two tickets (or any other type of event), and the player device 300 determines that the total outcome amount to be revealed to the player is nine dollars (e.g., based on a signal received from the controller 400). In this case, the player device 300 may inform the player that he or she will instead receive five tickets (i.e., four tickets each having a $1.00 event result and one ticket having a $5.00 event result). The total number of events can also be based on a predetermined formula or table similar to those described with respect to 806. For example, a stored table may indicate that a total of five events are provided if the total outcome amount is less than ten dollars, a total of ten events are provided if the total outcome amount is at least ten dollars but less than one hundred dollars, and a total of twenty events are provided if the total outcome amount is at least one hundred dollars.

At 908, a result associated with at least one scratch-off type instant game ticket is revealed to the player (e.g., by being displayed to a player via the display 354 of a wireless telephone 304. For example, a player may use a mouse coupled to a PC to electronically "scratch-off" a covering to reveal an event outcome amount. According to other embodiments, an event outcome amount is automatically displayed to the player. For example, one result may be displayed to a player once an hour from 9:00 AM to 5:00 PM. According to one embodiment, the player may also specify a delivery method associated with a game session. For example, a player may request that event results be delivered to a particular electronic mail address.

If the event result is not a winning result at 910 (e.g., is associated with a positive event outcome amount), the process ends at 912. If the event result is a winning result at 910, it is arranged for the player to receive payment of an amount associated with the winning result at 914.

Figure 10:
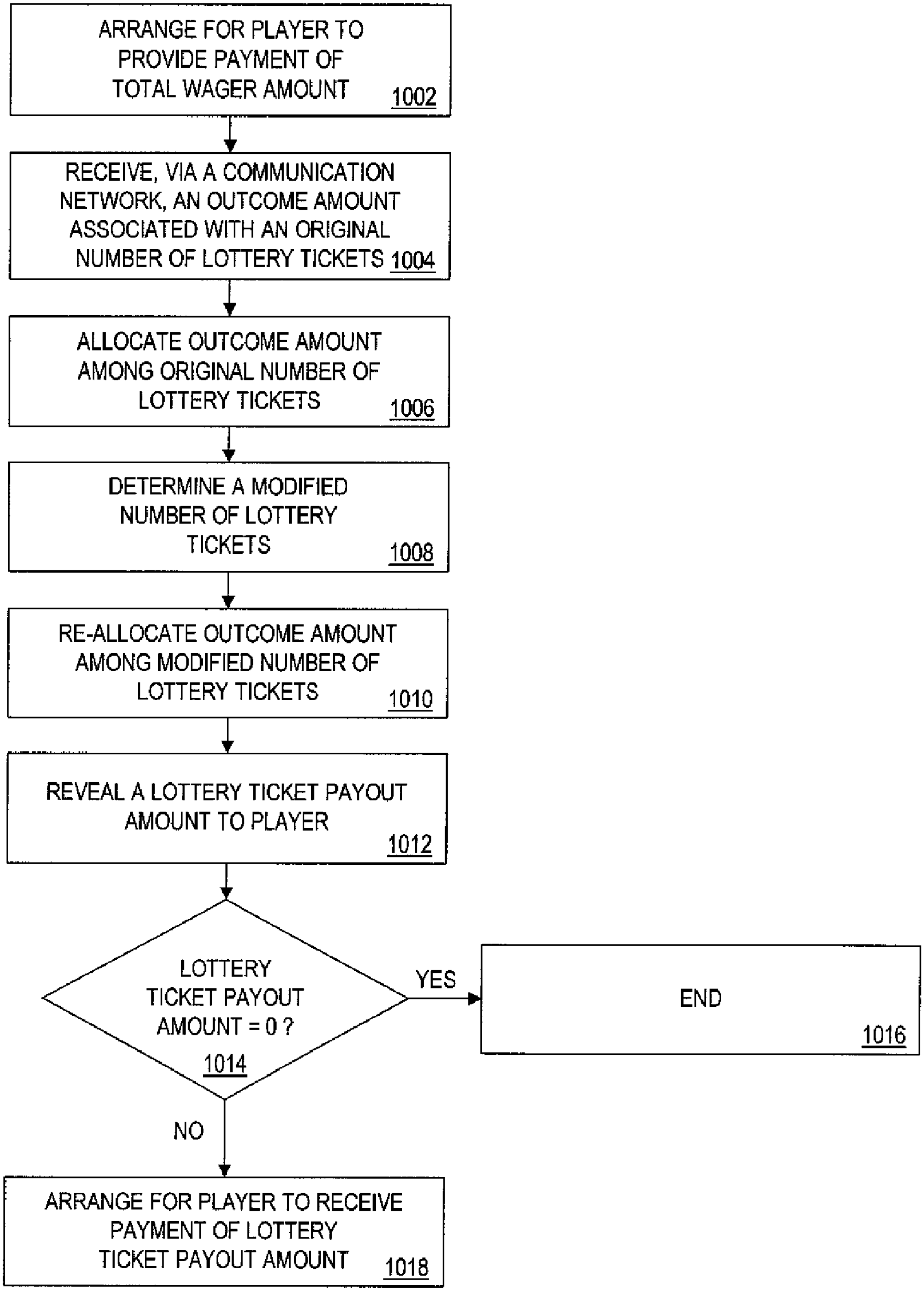
FIG. 10 is a flow chart of a method that may be performed according to another embodiment of the present invention.

FIG. 10 is a flow chart of a method that may be performed according to another embodiment of the present invention. At 1002, it is arranged for a player to provide payment of a total wager amount. At 1004, an outcome amount associated with an original number of lottery tickets is received via a communication network.

At 1006, the received outcome amount is allocated among the original number of lottery tickets. For example, a lottery device may randomly allocate the outcome amount among the total number of events based further on a player allocation parameter. For example, a player may indicate that he or she prefers to win many small event payout amounts (or a few large event payout amounts). Similarly, the event payout amounts may be allocated based on an order of the event payout amounts (small event payout amounts are to be indicated to the player first), a predetermined formula (e.g., based on a standard deviation associated with the event payout amounts), and/or an event payout amount table (e.g., created and updated based on information associated with the past behavior of the player and/or other players).

The allocation of the outcome amount may be performed by, for example, the player device 300, the controller 400, and/or the event result server 450. According to another embodiment, each event outcome amount may be retrieved from a set of predetermined event outcome amounts stored by any one or more of those devices. Note that instead of allocating an outcome amount, the player device 300 may randomly generate an event result associated with each event (e.g., using a random number generation process and an allocated expected value).

According to this embodiment of the present invention, a modified number of lottery tickets is determined at 1008. For example, a player may request that a remaining number of lottery tickets be increased or decreased.

At 1010, the outcome amount is re-allocated among the modified number of lottery tickets. For example, a player may have originally received one hundred lottery ticket events in exchange for a twenty dollar total wager amount. In this case, the player device 300 may have determined that an outcome amount of $25.00 is associated with those tickets. After playing fifty lottery tickets on his or her player device 300 and receiving $15.00 in winning tickets, however, the player may request that the number of remaining lottery tickets (i.e., the fifty remaining tickets) be increased to one hundred. In this case, the player device 300 may re-allocate the remaining $10.00 of winnings among the modified number of tickets (i.e., among the one hundred tickets).

At 1012, a lottery ticket payout amount is revealed to the player (e.g., is displayed via the output device 250). If the lottery ticket payout amount is zero at 1014, the process ends at 1016. If the lottery ticket payout amount is not zero at 1014, it is arranged for the player to receive, via a payment identifier, payment of the lottery ticket payout amount.

According to another embodiment, the player device 300 may instead provide a payout redemption code to the player. In this case, the player can bring the payout redemption code to a merchant or an ATM device to receive payment of his or her total payout amount. The payout redemption code may be, for example, a verifiable "hash" value generated when player and event information are used with a hash function, such as a one-way hash function. A hash function is a transformation that takes input information and returns a hash value. In general, one can think of a hash value as a "digital fingerprint" of the input information. For example, the input information to the hash function may be the player's name and address and information about a set of events (e.g., a series of event results). In this case, the hash function would generate the payout redemption code based on the input information. The controller 400 could then validate the payout redemption code using an associated function. Applicable hash functions and other encryption techniques are described in Bruce Schneier, "Applied Cryptography: Protocols, Algorithms, and Source Code in C" (John Wiley & Sons, Inc., 2nd Ed. 1996). Note that the payout redemption code may, for example, be provided to the player in a human-recognizable format or may be stored on the player device 300.

Additional Embodiments

The following are several examples which illustrate various embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

According to one embodiment, the allocation of an outcome amount may depend on, for example, the size of the largest event outcome amount (e.g., an event outcome amount equal to the largest "jackpot" available in a game may always be allocated to the last event).

According to another embodiment, the allocation of an outcome amount is also based on information about the player. The information about the player may include, for example: a location, a player status (e.g., indicating if the player has recently registered with the controller 400 or has previously purchased a large number of events via the controller 400), and/or demographic information.

According to other embodiments, the allocation of an outcome amount by the gaming system 200 may also be based on, for example: a time of day, a time of year, and/or revenue management information (supply and/or demand information associated with the gaming system 200 or with a particular kiosk).

According to one embodiment, player allocation preferences are dynamically calculated and displayed to the player For example, as the player adjusts a graphical representation of a sliding scale labeled "event outcome amount variation," a display indicating a minimum outcome amount and a maximum outcome amount may be updated and displayed to the player at each end of the scale. According to another embodiment, a player may select a pre-determined parameter package from a group of packages (e.g., associated with a set of allocation preferences). According to another embodiment, the gaming system 200 may suggest a particular package, or a modification to one or more allocation preferences, to the player. According to one embodiment, the gaming system 200 may automatically modify one or more allocation preferences.

According to another embodiment, paper game tickets are provided to the player. For example, a player may use a kiosk located at a merchant's store to select allocation preferences, and the kiosk may generate a set of paper scratch-off tickets to be played by the player.

According to one embodiment of the present invention, the total payout amount is immediately provided to player using the player's credit card number. In this case, the player may not be informed of the total payout amount until he or she completes the game session. According to another embodiment, the player must visit, for example, a merchant's store or an ATM device to receive payment of the total payout amount. According to one embodiment, player may be allowed to receive payment of event payout amounts as they are revealed (e.g., before he or she has finished a game session).

According to one embodiment, a player provides payment of a total wager amount before any event results are revealed According to another embodiment, a player may first play a game session and later provide payment to the controller 400 (e.g., at the end of the day).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A game apparatus comprising:

a processor in communication with a controller device; and a storage device in communication with the processor, the storage device storing instructions configured to direct the processor to:

arrange for a player to provide, via a payment identifier, payment of a total wager amount;

transmit an indication associated with the total wager amount to a controller device;

receive an indication associated with a total payout amount from the controller device;

receive from the player an indication associated with a total number of lottery reveal events;

based on a parameter specified by the player, allocate the total payout amount among the total number of lottery reveal events;

after receiving the indication associated with the total payout amount reveal at least a portion of the total payout amount; and arrange for the player to receive, via the payment identifier, payment of the total payout amount.

2. The game apparatus of claim 1, in which the total payout amount is based on a total number of events that is different than the total number of lottery reveal events.

3. A non-transitory computer-readable medium storing instructions adapted to be executed by a processor to perform a method of operating a gaming device, the method comprising:

arranging for a player to provide, via a payment identifier, payment of a total wager amount;

transmitting an indication associated with the total wager amount to a controller device;

receiving via a gaming device an indication associated with a total payout amount determined for the player, receiving from the player an indication associated with a plurality of lottery reveal events;

based on a parameter specified by the player, allocating, via the gaming device, the total payout amount among the plurality of lottery reveal events, after receiving the indication associated with the total payout amount determined for the player;

after receiving the indication associated with the total payout amount revealing at least a portion of the total amount; and arranging for the player to receive, via the payment identifier, payment of the total payout amount.

4. The computer-readable medium of claim 3, in which the total payout amount determined for the player is based on a total number of events that is different than the number of the plurality of lottery reveal events.

5. A game apparatus comprising:

a processor; and a storage device in communication with the processor, the storage device storing instructions configured to direct the processor to:

determine an outcome amount due a player based on a first total number of events;

after determining the outcome amount due the player based on the first total number of events, based on a parameter specified by the player, allocate the outcome amount among a second total number of reveal events and after determining the outcome amount due the player, reveal to the player at least one of the second total number of reveal events.

6. The game apparatus of claim 5, in which each of the second total number of events comprises an instant lottery ticket.

7. The game apparatus of claim 5, in which the first total number of events is different than the second total number of reveal events.

8. A non-transitory computer-readable medium storing instructions adapted to be executed by a processor to perform a method of operating a gaming device, the method comprising:

determining via a gaming device an outcome amount due a player based on a first total number of events;

after determining the outcome amount due the player based on the first total number of events, based on a parameter specified by the player, allocating, via the gaming device, the outcome amount among second total number of reveal events and after determining the outcome amount due the player, revealing to the player at least one of the second total number of reveal events.

9. The computer-readable medium of claim 8, in which each of the second total number of reveal events comprises an instant lottery ticket.

10. The computer readable medium of claim 8, in which the first total number of events is different than the second total number of reveal events.

* * * * *